United States Patent
Yin et al.

(10) Patent No.: US 9,692,582 B2
(45) Date of Patent: Jun. 27, 2017

(54) SYSTEMS AND METHODS FOR SIGNALING REFERENCE CONFIGURATIONS

(71) Applicant: Sharp Laboratories of America, Inc., Camas, WA (US)

(72) Inventors: Zhanping Yin, Vancouver, WA (US); Shohei Yamada, Camas, WA (US); Ahmad Khoshnevis, Portland, OR (US)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 13/891,156

(22) Filed: May 9, 2013

(65) Prior Publication Data
US 2014/0334351 A1 Nov. 13, 2014

(51) Int. Cl.
*H04L 5/14* (2006.01)
*H04L 5/00* (2006.01)

(52) U.S. Cl.
CPC .............. *H04L 5/14* (2013.01); *H04L 5/0091* (2013.01)

(58) Field of Classification Search
CPC .... H04L 5/04; H04W 72/0446; H04W 72/04; H04W 24/02; H04W 36/0011; H04W 72/0406
USPC ......................................................... 370/280
See application file for complete search history.

(56) References Cited

U.S. PATENT DOCUMENTS

| | | | |
|---|---|---|---|
| 8,670,410 B2 * | 3/2014 | Luo ....................... | H04L 1/1607 370/331 |
| 2011/0105136 A1 * | 5/2011 | Choi ..................... | H04W 48/08 455/452.1 |
| 2011/0176461 A1 | 7/2011 | Astely et al. | |
| 2011/0274015 A1 | 11/2011 | Astely et al. | |
| 2012/0113875 A1 | 5/2012 | Alanärä et al. | |

(Continued)

FOREIGN PATENT DOCUMENTS

| | | |
|---|---|---|
| WO | 2010/086498 | 8/2010 |
| WO | 2011/077288 | 6/2011 |
| WO | 2012/167431 | 12/2012 |

OTHER PUBLICATIONS

Huawei, HiSilicon, "Signaling Mechanisms for TDD eIMTA," 3GPP TSG RAN WG1 Meeting #72bis, R1-130882, Apr. 2013.

(Continued)

*Primary Examiner* — Edan Orgad
*Assistant Examiner* — Emmanuel Maglo
(74) *Attorney, Agent, or Firm* — Austin Rapp

(57) ABSTRACT

A user equipment (UE) for receiving time-division duplexing (TDD) uplink/downlink (UL/DL) configurations is described. The UE includes a processor and instructions stored in memory that is in electronic communication with the processor. The UE receives a primary TDD UL/DL configuration for a serving cell and reconfiguration information. The UE determines a downlink (DL)-reference TDD UL/DL configuration based on the primary TDD UL/DL configuration and the reconfiguration information. The UE determines an uplink (UL)-reference TDD UL/DL configuration based on the primary TDD UL/DL configuration and the reconfiguration information. The UE performs Physical Downlink Shared Channel (PDSCH) operations based on the DL-reference TDD UL/DL configuration. The UE performs Physical Uplink Shared Channel (PUSCH) operations based on the UL-reference TDD UL/DL configuration.

10 Claims, 11 Drawing Sheets

(56) References Cited

U.S. PATENT DOCUMENTS

| | | | | |
|---|---|---|---|---|
| 2012/0269179 | A1* | 10/2012 | Li | H04L 1/1854 370/336 |
| 2012/0269180 | A1* | 10/2012 | Li | H04L 1/1822 370/336 |
| 2012/0281600 | A1* | 11/2012 | Tseng | H04W 76/048 370/280 |
| 2013/0039193 | A1 | 2/2013 | Yin et al. | |
| 2013/0044652 | A1 | 2/2013 | Wang et al. | |
| 2013/0083683 | A1* | 4/2013 | Hwang | H04W 64/00 370/252 |
| 2013/0083708 | A1* | 4/2013 | Lin | H04L 5/14 370/280 |
| 2013/0083736 | A1* | 4/2013 | Yin | H04W 72/0446 370/329 |
| 2013/0094467 | A1* | 4/2013 | Kwon | H04L 5/001 370/329 |
| 2013/0114472 | A1* | 5/2013 | Tamaki | H04L 5/001 370/280 |
| 2013/0155915 | A1* | 6/2013 | Park | H04W 72/042 370/280 |
| 2013/0223296 | A1* | 8/2013 | Zeng | H04L 5/0007 370/280 |
| 2013/0242819 | A1* | 9/2013 | He | H04W 52/0235 370/280 |
| 2013/0272169 | A1* | 10/2013 | Wang | H04W 72/0446 370/280 |
| 2013/0272170 | A1* | 10/2013 | Chatterjee | H04W 28/02 370/280 |
| 2014/0092786 | A1* | 4/2014 | He | H04W 52/0258 370/280 |

OTHER PUBLICATIONS

Huawi, HiSilicon, "Backward Compatibility for TDD eIMTA," 3GPP TSG RAN WG1 Meeting #72bis, R1-130884, Apr. 2013.
Intel Corporation, "Discussion on Signalling Mechanisms for TDD UL-DL Reconfiguration," 3GPP TSG RAN WG1 Meeting #72bis, R1-130916, Apr. 2013.
Alcatel-Lucent Shanghai Bell, Alcatel-Lucent, "Signalling Mechanisms for TDD UL-DL Reconfiguration," 3GPP TSG RAN WG1 Meeting #72bis, R1-130937, Apr. 2013.
CATT, "Signalling Mechanisms for TDD UL-DL Reconfiguration," 3GPP TSG RAN WG1 Meeting #72bis, R1-130980, Apr. 2013.
CATT, "Further Evaluation Results on TDD UL-DL Reconfiguration," 3GPP TSG RAN WG1 Meeting #72bis, R1-130994, Apr. 2013.
Samsung, "Signaling for TDD UL-DL Reconfiguration," 3GPP TSG RAN WG1 Meeting #72bis, R1-131012, Apr. 2013.
ZTE, "Issues about Data Transmission in TDD-eIMTA," 3GPP TSG RAN WG1 Meeting #72bis, R1-131065, Apr. 2013.
ZTE, "Signaling to Reconfigure TDD UL-DL Allocation," 3GPP TSG RAN WG1 Meeting #72bis, R1-131066, Apr. 2013.
ITRI, "Signalling Mechanism and HARQ Timeline for TDD eIMTA," 3GPP TSG-RAN WG1 Meeting #72bis, R1-131074, Apr. 2013.
Potevio, "Discussion on Signalling for Dynamic UL-DL Reconfiguration," 3GPP TSG RAN WG1 Meeting #72bis, R1-131082, Apr. 2013.
New Postcom, "Discussion on Signaling Mechanisms for eIMTA," 3GPP TSG RAN WG1 Meeting #72bis, R1-131113, Apr. 2013.
MediaTek Inc., "Discussion of Signaling Support for TDD eIMTA," 3GPP TSG-RAN WG1 Meeting #72bis, R1-131176, Apr. 2013.
HTC, "Methods to Support TDD UL-DL Traffic Adaptation," 3GPP TSG RAN WG1 Meeting #72bis, R1-131205, Apr. 2013.
Nokia Siemens Networks, Nokia, "Discussion on Signalling Support for the Indication of Dynamic TDD UL/DL Reconfiguration," 3GPP TSG-RAN WG1 Meeting #72bis, R1-131223, Apr. 2013.
Nokia Corporation, Nokia Siemens Networks, "Further Performance Evaluation on Possible Time Scales for TDD UL/DL Reconfiguration," 3GPP TSG-RAN WG1 Meeting #72bis, R1-131224, Apr. 2013.
Nokia Siemens Networks, Nokia, "Reference Configuration Method for Dynamic UL-DL Reconfiguration," 3GPP TSG-RAN WG1 Meeting #72bis, R1-131225, Apr. 2013.
NEC Group, "Reconfiguration Signalling and HARQ-Timing for TDD eIMTA System," 3GPP TSG RAN WG1 Meeting #72bis, R1-131263, Apr. 2013.
LG Electronics, "Signaling Mechanism for Dynamic TDD UL-DL Reconfiguration," 3GPP TSG RAN WG1 Meeting #72bis, R1-131292, Apr. 2013.
Panasonic, "Signalling Mechanisms for TDD UL-DL Reconfiguration," 3GPP TSG RAN WG1 Meeting #72bis, R1-131326, Apr. 2013.
InterDigital, "On L1 Based Signaling Mechanisms in Support of eIMTA," 3GP TSG-RAN WG1 Meeting #72bis, R1-131341, Apr. 2013.
Research in Motion, UK Limited, "TDD UL/DL Reconfiguration Signalling Methods," 3GPP TSG RAN WG1 Meeting #72bis, R1-131353, Apr. 2013.
Renesas Mobile Europe Ltd., "Considerations on Backwards Compatilbility for TDD eIMTA," 3GPP TSG RAN WG1 Meeting #72bis, R1-131368, Apr. 2013.
Renesas Mobile Europe Ltd., "Signalling Mechanisms for TDD eIMTA," 3GPP TSG RAN WG1 Meeting #72bis, R1-131369, Apr. 2013.
Sharp, "Signaling of Dynamic TDD UL-DL Reconfiguration," 3GPP TSG-RAN WG1 #72bis, R1-131383, Apr. 2013.
Qualcomm Incorporated, "Signaling Mechanisms for Reconfiguration," 3GPP TSG-RAN WG1 #72bis, R1-131395, Apr. 2013.
NTT DoCoMo, "Evaluation Results for eIMTA with Different Reconfiguration Time Scales," 3GPP TSG RAN WG1 Meeting #72bis, R1-131418, Apr. 2013.
Ntt DoCoMo, HARQ Design for eIMTA, 3GPP TSG RAN WG1 Meeting #72bis, R1-131419, Apr. 2013.
Ericsson, ST-Ericsson, "On Efficient Signaling of Dynamic TDD," 3GPP TSG-RAN WG1 #72bis, R1-131458, Apr. 2013.
Ericsson, ST-Ericsson, "On False Detection Impact with Implicit Signalling," 3GPP TSG-RAN WG1 #72bis, R1-131459, Apr. 2013.
Texas Instruments, "Signaling Mechanisms for Adaptive TDD UL/DI Reconfiguration," 3GPP TSG RAN WG1 #72bis, R1-131502, Apr. 2013.
Pantech, "Discussion on Signaling Methods for TDD UL-DL," 3GPP TSG RAN1 #72bis, R1-131524, Apr. 2013.
Qualcomm Incorporated, "Signaling Mechanisms for Reconfiguration," 3GPP TSG-RAN WG1 #72bis, R1-131629, Apr. 2013.
CMCC, "Discussion on Time Scale and HARQ Timeline for TDD eIMTA," 3GPP TSG-RAN WG1 #72bis, R1-131631, Apr. 2013.
CATT, "Other Design Aspects for TDD eIMTA," 3GPP TSG RAN WG1 Meetin g#72bis, R1-130981, Apr. 2013.
Samsung, "On HARQ Operation for TDD UL-DL Reconfiguration," 3GPP TSG-RAN WG1 #72bis, R1-131013, Apr. 2013.
Samsung, "Discussion on Other Potential Issues for TDD UL/DL Reconfigurations," 3GPP TSG RAN WG1 Meeting #72bis, R1-131014, Apr. 2013.
Potevio, "Discussion on Measurement and HARQ Timeline Issues for Dynamic UL-DL Reconfiguration," 3GPP TSG RAN WG1 Meeting #72bis, R1-131083, Apr. 2013.
Coolpad, "Backward Compatibility for Legacy UE," 3GPP TSG RAN WG1 Meeting #72bis, R1-131109, Apr. 2013.
MediaTek Inc., "Support for Legacy UEs in TDD eIMTA," 3GPP TSG-RAN1 #72bis Meeting, R1-131177, Apr. 2013.
Alcatel-Lucent Shanghai Bell, Alcatel-Lucent, "Discussion on HARQ/Scheduling in TDD eIMTA," 3GPP TSG RAN WG1 Meeting #72bis, R1-131200, Apr. 2013.
HTC, "On HARQ Timing Issues in TDD eIMTA Systems," 3GPP TSG RAN WG1 Meeting #72bis, R1-131206, Apr. 2013.
NEC Group, "Backward Compatibility for TDD eIMTA System," 3GPP TSG RAN WG1 Meeting #72bis, R1-131264, Apr. 2013.
LG Electronics, "Additional Issues on Tdd UL-DL Reconfiguration," 3GPP TSG RAN WG1 Meeting #72bis, R1-131293, Apr. 2013.
Research in Motion, Uk Limited, "Potential HARQ Issues in TDD eIMTA," 3GPP TSG RAN WG1 Meeting #72bis, R1-131354, Apr. 2013.

(56) References Cited

OTHER PUBLICATIONS

Renesas Mobile Europe Ltd., "Signaling Mechanisms for TD eIMTA," 3GPP TSG RAN WG1 Meeting #72bis, R1-131396, Apr. 2013.
Ericsson, ST-Ericsson, "Dynamic TDD on NCT," 3GPP TSG-RAN WG1 #72bis, R1-131460, Apr. 2013.
Intel Corporation, "Discussion on Evaluation Assumptions for LTE-TDD eIMTA Work Item," 3GPP TSG RAN WG1 Meeting #72bis, R1-131470, Apr. 2013.
Intel Corporation, "Discussion on Inter-Cell Measurements for LTE-TDD eIMTA," 3GPP TSG RAN WG1 Meeting #72bis, R1-131471, Apr. 2013.
Ericsson, Finalization for Introducing of Rel-11 Features, 3GPP TSG-RAN WG1 Meeting #71, R1-125402, Nov. 2012.
Editor (Motorola Mobility), "Finalisation for Introducing Rel-11 Features," 3GPP TSG-RAN WG1 Meeting #71, R1-125404, Nov. 2012.
Huawi, "Finalisation for Introducing Rel-11 Features," 3GPP TSG-RAN WG1 Meeting #71, R1-125403, Nov. 2012.
CATT, "TR36.828 v2.0.0 for Rel-11 FS_LTE_TDD_eIMTA," 3GPP TSG RAN WG1 Meeting #69, R1-122950, May 2012.
CATT, "New Work Item Proposal for Further Enhancements to Lte Tdd for Dl-Ul Interference Management and Traffic Adaptation," 3GPP Tsg-Ran Meeting #58, Rp-121772, Dec. 2012.

* cited by examiner

SYSTEMS AND METHODS FOR SIGNALING REFERENCE CONFIGURATIONS

TECHNICAL FIELD

The present disclosure relates generally to communication systems. More specifically, the present disclosure relates to systems and methods for signaling reference configurations.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
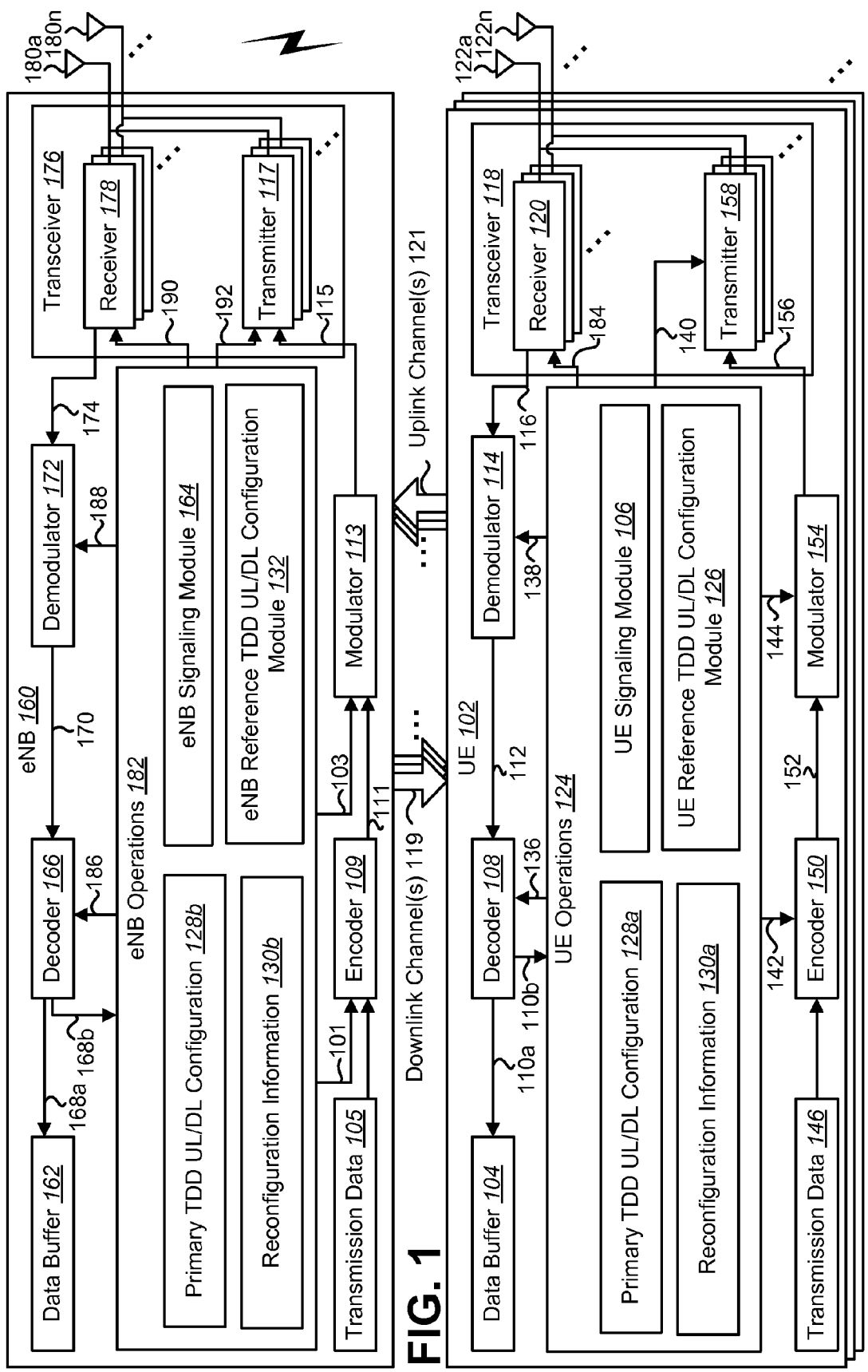
FIG. 1 is a block diagram illustrating one configuration of one or more evolved Node Bs (eNBs) and one or more user equipments (UEs) in which systems and methods for signaling reference configurations may be implemented.

A user equipment (UE) for receiving time-division duplexing (TDD) uplink/downlink (UL/DL) configurations is described. The UE includes a processor and executable instructions stored in memory that is in electronic communication with the processor. The UE receives a primary TDD UL/DL configuration for a serving cell and reconfiguration information. The UE also determines a downlink (DL)-reference TDD UL/DL configuration based on the primary TDD UL/DL configuration and the reconfiguration information. The UE further determines an uplink (UL)-reference TDD UL/DL configuration based on the primary TDD UL/DL configuration and the reconfiguration information. The UE additionally performs Physical Downlink Shared Channel (PDSCH) operations based on the DL-reference TDD UL/DL configuration. The UE also performs Physical Uplink Shared Channel (PUSCH) operations based on the UL-reference TDD UL/DL configuration.

The primary TDD UL/DL configuration may be received in at least one system information block (SIB) or at least one radio resource control (RRC) common message. The reconfiguration information may include physical (PHY) layer signaling or media access control (MAC) layer signaling.

The reconfiguration information may include explicit signaling that indicates a TDD reconfiguration to a secondary TDD UL/DL configuration. The DL-reference TDD UL/DL configuration may be determined based on a pair formed by the primary TDD UL/DL configuration and the secondary TDD UL/DL configuration. The UL-reference TDD UL/DL configuration may be determined based on a pair formed by the primary TDD UL/DL configuration and the secondary TDD UL/DL configuration.

The reconfiguration information may include SIB signaling or RRC signaling that indicates supported TDD UL/DL configurations. The reconfiguration information may also include PHY layer signaling that indicates a transmission direction of a subframe.

The UE may also determine a DL limit TDD UL/DL configuration based on the reconfiguration information. The DL-reference TDD UL/DL configuration may be determined based on a pair formed by the primary TDD UL/DL configuration and the DL limit TDD UL/DL configuration.

The UE may also determine a UL limit TDD UL/DL configuration based on the reconfiguration information. The UL-reference TDD UL/DL configuration may be determined based on a pair formed by the primary TDD UL/DL configuration and the DL limit TDD UL/DL configuration.

An evolved Node B (eNB) for sending TDD UL/DL configurations is also described. The eNB includes a processor and executable instructions stored in memory that is in electronic communication with the processor. The eNB sends a primary TDD UL/DL configuration for a serving cell and reconfiguration information. The eNB also determines a DL-reference TDD UL/DL configuration based on the primary TDD UL/DL configuration and the reconfiguration information. The eNB further determines an UL-reference TDD UL/DL configuration based on the primary TDD UL/DL configuration and the reconfiguration information. The eNB additionally performs PDSCH operations based on the DL-reference TDD UL/DL configuration. The eNB also performs PUSCH operations based on the UL-reference TDD UL/DL configuration.

The primary TDD UL/DL configuration is sent in at least one SIB or at least one RRC common message. The reconfiguration information may include PHY layer signaling or MAC layer signaling.

The reconfiguration information may include explicit signaling that indicates a TDD reconfiguration to a secondary TDD UL/DL configuration. The DL-reference TDD UL/DL configuration may be determined based on a pair formed by the primary TDD UL/DL configuration and the secondary TDD UL/DL configuration. The UL-reference TDD UL/DL configuration may be determined based on a pair formed by the primary TDD UL/DL configuration and the secondary TDD UL/DL configuration.

The reconfiguration information may include SIB signaling or RRC signaling that indicates supported TDD UL/DL configurations. The reconfiguration information may also include PHY layer signaling that indicates a transmission direction of a subframe.

The eNB may also determine a DL limit TDD UL/DL configuration based on the reconfiguration information. The DL-reference TDD UL/DL configuration may be determined based on a pair formed by the primary TDD UL/DL configuration and the DL limit TDD UL/DL configuration.

The eNB may also determine a UL limit TDD UL/DL configuration based on the reconfiguration information. The UL-reference TDD UL/DL configuration may be determined based on a pair formed by the primary TDD UL/DL configuration and the DL limit TDD UL/DL configuration.

A method for receiving TDD UL/DL configurations by a UE is also described. The method includes receiving a primary TDD UL/DL configuration for a serving cell and reconfiguration information. The method also includes determining a DL-reference TDD UL/DL configuration based on the primary TDD UL/DL configuration and the reconfiguration information. The method further includes determining an UL-reference TDD UL/DL configuration based on the primary TDD UL/DL configuration and the reconfiguration information. The method additionally includes performing PDSCH operations based on the DL-reference TDD UL/DL configuration. The method also includes performing PUSCH operations based on the UL-reference TDD UL/DL configuration.

A method for sending TDD UL/DL configurations by an eNB is also described. The method includes sending a primary TDD UL/DL configuration for a serving cell and reconfiguration information. The method also includes determining a DL-reference TDD UL/DL configuration based on the primary TDD UL/DL configuration and the reconfiguration information. The method further includes determining an UL-reference TDD UL/DL configuration based on the primary TDD UL/DL configuration and the reconfiguration information. The method additionally includes performing PDSCH operations based on the DL-reference TDD UL/DL configuration. The method also includes performing PUSCH operations based on the UL-reference TDD UL/DL configuration.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe configuration and reconfiguration signaling associated with dynamic TDD UL/DL reconfiguration. In particular, the systems and methods disclosed herein describe TDD UL/DL configuration signaling, reconfiguration signaling and reference TDD UL/DL configurations for dynamic TDD UL/DL reconfiguration cells. It should be noted that dynamic TDD UL/DL reconfiguration may also be referred to as enhanced interference mitigation with traffic adaptation (eIMTA). Therefore, a cell that supports dynamic TDD UL/DL reconfiguration (e.g., a dynamic TDD UL/DL reconfiguration cell) may be referred to as an eIMTA cell.

As used herein, a "TDD UL/DL configuration" is a configuration defined in Table (3) (from Table 4.2-2 in 3GPP TS 36.211). Currently, there are seven TDD UL/DL configurations specified from configuration 0 to configuration 6. These TDD UL/DL configurations are discussed in more detail in connection with FIG. 4.

Enhanced interference mitigation with traffic adaptation (eIMTA) is a major topic for LTE TDD networks to enable more flexible use of spectrum using dynamic TDD UL/DL allocation based on traffic load. Therefore, some subframes may be flexible and convertible and may be used as either downlink or uplink as described below. A TDD UL/DL configuration may also be referred to as a TDD UL-DL reconfiguration.

As used herein, "eIMTA cell configuration" may include a primary TDD UL/DL configuration and one or more secondary TDD UL/DL configurations. In the case of a primary cell (PCell), the primary TDD UL/DL configuration may be defined in a system information block (SIB) (e.g., SIB1). In the case of a secondary cell (SCell) the primary TDD UL/DL configuration may be defined in a radio resource control (RRC) message (e.g., RRCCommon). The secondary TDD UL/DL configurations may be used to define the sets of static and flexible subframes, or to define the set of TDD UL/DL configurations allowed for reconfiguration, or to define the UL-reference UL/DL configuration and DL-reference UL/DL configuration of the eIMTA cell.

As used herein, "eIMTA cell configuration signaling" may include the signaling to indicate the configuration of an eIMTA cell. The configuration signaling may include one or more SIB1 or RRC signals/messages containing eIMTA cell configuration information. The term "eIMTA cell reconfiguration" may refer to the procedure in which an eMITA cell changes from one TDD UL/DL configuration to another TDD UL/DL configuration. Also, as used herein, "eIMTA cell reconfiguration signaling" may include the signaling that indicates or initiates an eMITA cell reconfiguration.

Several signaling methods have been considered in an LTE Release-11 study, including system information change, radio resource control (RRC) signaling, medium access control (MAC) signaling and physical (PHY) layer signaling. It was concluded that the faster the reconfiguration is, the greater the benefits from dynamic TDD UL/DL reconfiguration. Furthermore, another LTE Release-11 study concluded that the reconfiguration signaling may be considered between physical (PHY) layer signaling and media access control (MAC) signaling. However, physical broadcast channel (PBCH) based signaling may not be considered as PHY signaling.

Hybrid automatic repeat request acknowledgement (HARQ-ACK) timing is a major issue in dynamic TDD UL/DL reconfiguration cell operation. Because legacy Release-11 and before UEs do not understand eIMTA signaling, these UEs will follow the HARQ-ACK timing based on the TDD UL/DL configuration signaled in a system information block (e.g., SIB1) in the case of PCell or a radio resource control (RRC) message (e.g., RRCCommon) in the case of SCell. However, Release-12 and beyond UEs may follow different HARQ-ACK timings based on a DL-reference UL/DL configuration and a UL-reference UL/DL configuration. An eIMTA cell may support two sets of timings simultaneously if both legacy UEs and Release-12 UEs are present. Therefore, an eIMTA cell may address additional scheduling constraints and increased system complexity.

It is desirable to have a smooth reconfiguration transition that utilizes existing TDD UL/DL configuration timings to reduce the impact of reconfiguration transition. There are two main approaches to determining HARQ-ACK timing related to reconfiguration schemes. In a known implementation, a new TDD UL/DL configuration is signaled, and then a transition from the old TDD UL/DL configuration to the new TDD UL/DL configuration is performed. The association timing of the new TDD UL/DL configuration will be applied after the transition. However, in this implementation, the transition behavior (e.g., the association timing in the transition period) has to be specified for the switching. During the transition period, the association timing has to be changed from the old TDD UL/DL configuration to the new TDD UL/DL configuration.

In another known implementation, separate reference TDD UL/DL configurations may be defined for PDSCH and physical uplink shared channel (PUSCH) timings. For example, a DL-reference TDD UL/DL configuration may be defined for PDSCH and a UL-reference UL/DL configuration may be defined for PUSCH. The reference TDD UL/DL configurations may be signaled by SIB and/or RRC signaling, and may indicate the allowed TDD UL/DL configurations for reconfiguration. Therefore, the same timing may be maintained across all transitions within a reconfiguration range.

In the systems and methods described herein, DL-reference TDD UL/DL configurations and UL-reference TDD UL/DL configurations may be dynamically determined during and after a reconfiguration. The reference TDD UL/DL configurations may be used even in the first implementation with explicit signaling of a reconfiguration. Furthermore, considering legacy UE support, the described systems and methods may reuse existing tables from Release-11 inter-band TDD carrier aggregation. The described systems and methods may reduce the impact during a transition associated with the first known implementation, and may reduce or eliminate extra TDD UL/DL configuration signaling associated with the second known implementation.

A dynamic TDD UL/DL reconfiguration cell may be configured with a default TDD UL/DL configuration and an allowed TDD UL/DL reconfiguration range. The TDD UL/DL reconfiguration range may be a set of TDD UL/DL configurations, or other states between two configured TDD UL/DL configurations. Therefore, a dynamic TDD UL/DL reconfiguration cell may be configured with multiple TDD UL/DL configurations.

A primary TDD UL/DL configuration may be a default TDD UL/DL configuration. The primary TDD UL/DL configuration may also be referred to as a first TDD UL/DL configuration. In one implementation, a secondary TDD UL/DL configuration may be configured in addition to the primary TDD UL/DL configuration. In another implementation, multiple secondary TDD UL/DL configurations may be configured in addition to the primary TDD UL/DL configuration. Therefore, a dynamic TDD UL/DL reconfiguration cell may be configured with a primary TDD UL/DL configuration and at least one secondary TDD UL/DL configuration.

A dynamic TDD UL/DL reconfiguration cell is a TDD cell that supports dynamic TDD UL/DL reconfiguration to adapt the traffic load on the cell. In LTE time-division duplexing (LTE TDD), the same frequency band may be used for both uplink and downlink signals. To achieve different DL and UL allocations (e.g., traffic ratios) in LTE TDD, seven UL/DL configurations are given in 3GPP specifications (e.g., 3GPP TS 36.211). These allocations can allocate between 40% and 90% of subframes to DL signals.

According to current specifications (e.g., LTE Releases 8, 9, 10 and 11), a system information change procedure is used to change the TDD UL/DL configuration. This procedure has a long delay, and requires a cold system restart (e.g., all UEs in a system cannot transmit and receive for a certain period of time in order to disconnect the TDD UL/DL associations of the old TDD UL/DL configuration and set up new associations). It should be noted that a subframe association may be referred to as a "UL/DL association," which may include UL-to-DL subframe associations and DL-to-UL subframe associations. Examples of associations include association of a DL subframe (PDCCH) to UL power control in a UL subframe, association of a DL subframe physical DL control channel (PDCCH) to physical UL shared channel (PUSCH) allocation in a UL subframe, associations of acknowledgement and negative acknowledgement (ACK/NACK) feedback on UL subframe(s) for physical downlink shared channel (PDSCH) transmissions in DL subframe(s), association of acknowledgement and negative acknowledgement (ACK/NACK) feedback on a physical hybrid automatic repeat request (HARQ) indicator channel (PHICH) or physical downlink control channel (PDCCH) for physical UL shared channel (PUSCH) transmission(s) in UL subframe(s), etc.

Known PHY layer signaling may be extended to enable dynamic DL-to-UL conversion. For example, a special subframe type 2 may be used, which may be viewed as an extension of a current standard special subframe that is used for DL-to-UL transition. This special subframe type 2 can be used to provide UL transmissions while maintaining existing TDD UL/DL associations. PHY layer signaling may also include using downlink control information (DCI) 0/4 formats for PUSCH scheduling following the association timings of a UL-reference TDD UL/DL configuration, and using DCI formats 1/2 and extensions for PDSCH scheduling, etc.

As used herein, a "Release 12 UE" may be a UE that may operate in accordance with anticipated 3GPP Release 12 specifications and possibly subsequent specifications. A Release 12 UE may be a UE that supports dynamic TDD UL/DL reconfiguration. Additionally, as used herein, a "legacy UE" may be a UE that may operate in accordance with earlier (e.g., LTE Releases 8, 9, 10, 11) specifications.

Dynamic TDD UL/DL reconfiguration may be applied for both DL-to-UL and UL-to-DL reconfiguration or switching. Dynamic TDD UL/DL reconfiguration allows applying one TDD UL/DL configuration for PDSCH hybrid automatic repeat request acknowledgement (HARQ-ACK) timing and applying another TDD UL/DL configuration for PUSCH scheduling and PUSCH HARQ-ACK timing. UEs that support dynamic TDD UL/DL reconfiguration may follow these timings based on the corresponding reference TDD UL/DL configurations in an allowed TDD UL/DL reconfiguration range (e.g., switching region). Legacy UEs may follow the existing associations without any change or knowledge of the dynamic TDD UL/DL reconfiguration. However, the eNB may restrict the legacy UEs in some subframes to maintain backward compatible timing.

In known LTE TDD systems, the UL and DL allocation is chosen from seven defined TDD UL/DL configurations, and is synchronized system-wide. Currently, TDD UL/DL allocation reconfiguration in a cell may be very costly because all transmissions have to be stopped to adjust the TDD UL/DL associations. A change in one cell may cause or accompany a sequence of changes at neighbor cells (and their neighbor cells, etc.) to match TDD UL/DL configuration synchronization at neighbor cells (and their neighbor cells, etc.). Furthermore, current TDD UL/DL allocation reconfiguration requires a system information change, which has long delay and is not adaptive to instantaneous or short-term changes in traffic load.

In current specifications (e.g., LTE Releases 8, 9, 10 and 11), a system information change procedure may be used to change the TDD UL/DL configuration. This procedure requires multiple broadcast channel intervals and thus has a long delay and cannot adapt to an instantaneous traffic load change. Due to different TDD UL/DL associations, all transmitters may have to turn off transmissions altogether to disconnect the TDD UL/DL associations of the old TDD UL/DL configuration and to set up the new associations.

This may cause a huge loss of system capacity (e.g., offered load on uplink or downlink) and user traffic interruption. Therefore, the reconfiguration of UL and DL allocation may also be very costly. Furthermore, a change in one cell may force adjacent cells to change their TDD UL/DL configurations. Thus, a "ripple" effect may occur. With high traffic load fluctuation, frequent TDD UL/DL reconfiguration may cause serious network problems.

When the network aggregated traffic load-to-capacity ratio is low, a TDD UL/DL configuration is acceptable if the UL traffic and DL traffic load can be supported by the allocated UL subframes and DL subframes, respectively. In this case, the actual TDD UL/DL traffic ratio may be the same or different from the TDD UL/DL allocation. On the other hand, if the total traffic load-to-capacity ratio is high, a better matching TDD UL/DL ratio may be configured.

A reconfiguration may be needed in several cases. For example, a reconfiguration may be needed if the allocated UL resource cannot support the UL traffic load. In another example, reconfiguration may be needed if the allocated DL resource cannot support the DL traffic load. Furthermore, a reconfiguration may be used to adapt to a traffic load with a better matching TDD UL/DL allocation. For instance, a reconfiguration may be needed if a current TDD UL/DL configuration does not match the UL-to-DL traffic ratio.

In order to better adapt to traffic conditions, dynamic TDD UL/DL reconfiguration procedures may be supported aside from the system information change. Dynamic TDD UL/DL reconfiguration may maintain backward compatibility (for legacy UEs, for example) and provide more flexibility (for UEs operating in accordance with Release 12 specifications and beyond, for example) with fast subframe modifications based on real-time traffic changes. Furthermore, different TDD UL/DL configurations in neighboring cells may be supported (in Release 11, for example) in a temporary or persistent manner with co-channel interference mitigation techniques. The different TDD UL/DL configurations may be caused by different initial network configurations and/or by dynamic TDD UL/DL reconfiguration changes with traffic adaptation. The purpose of dynamic TDD UL/DL reconfiguration may not be limited to traffic conditions. For example, there may be one or multiple factors that may be considered when deciding to use dynamic TDD UL/DL reconfiguration (e.g., interference mitigation, overhead reduction, mobility, an operator's decision, etc.).

In Releases 8, 9, 10 and 11, the TDD UL/DL associations on PDSCH HARQ-ACK, PUSCH scheduling and PUSCH HARQ-ACK are defined by the TDD UL/DL configuration. All legacy UEs in the network follow the same PDSCH HARQ-ACK report associations defined by the given TDD UL/DL configuration. Similarly, all legacy UEs in the network follow the same PUSCH scheduling and PUSCH HARQ-ACK report associations defined by the given TDD UL/DL configuration.

However, dynamic TDD UL/DL reconfiguration provides an approach that may separate PDSCH and PUSCH timing associations based on different reference TDD UL/DL configurations. For example, a network (e.g., one or more UEs and one or more eNBs) may be configured to allow dynamic TDD UL/DL reconfiguration based on traffic adaptation (aside from the default TDD UL/DL configuration as in Releases 8, 9, 10 and 11). For instance, a UE that is configured to allow dynamic TDD UL/DL reconfiguration may utilize one reference TDD UL/DL configuration for PDSCH HARQ-ACK association (e.g., a DL-reference TDD UL/DL configuration) and another reference TDD UL/DL configuration for PUSCH scheduling and PUSCH HARQ-ACK association (e.g., a UL-reference TDD UL/DL configuration), while the UE has knowledge of a default TDD UL/DL configuration (e.g., a primary TDD UL/DL configuration). Therefore, because a dynamic TDD UL/DL reconfiguration cell may dynamically change its TDD UL/DL configuration, the DL-reference TDD UL/DL configuration and UL-reference TDD UL/DL configuration should be specified.

The systems and method described herein provide methods to derive the reference TDD UL/DL configurations for the eIMTA cell based on the cell configuration and reconfiguration signaling. The described systems and methods may reuse existing lookup tables defined in Release-11, which may minimize changes to specifications. Furthermore, the described systems and methods may provide backward compatibility for UE operation and may provide smooth transition for a reconfiguration. In some implementations, this may be accomplished by maintaining the same DL-reference TDD UL/DL configuration or UL-reference TDD UL/DL configuration. In other implementations, different DL-reference TDD UL/DL configurations or UL-reference TDD UL/DL configurations may be determined.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope as claimed, but is merely representative of the systems and methods.

FIG. 1 is a block diagram illustrating one implementation of one or more eNBs 160 and one or more UEs 102 in which systems and methods for signaling reference configurations may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 110a-b. For example, a first UE-decoded signal 110a may comprise received payload data, which may be stored in a data buffer 104. A second UE-decoded signal 110b may comprise overhead data and/or control data. For example, the second UE-decoded signal 110b may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE signaling module 106, a UE reference TDD UL/DL configuration module 126, a primary TDD UL/DL configuration 128a and reconfiguration information 130a.

It should be noted that in some implementations, the UE 102 may include built-in support for dynamic TDD UL/DL reconfiguration. A UE 102 may have different behaviors depending on whether the UE 102 includes support for dynamic TDD UL/DL reconfiguration. For example, a Release-12 UE 102 may support eIMTA (e.g., a Release-12 UE 102 may support dynamic TDD UL/DL reconfiguration). However, a legacy (e.g., Release-11) UE 102 may not support eIMTA.

The UE signaling module 106 may receive a primary TDD UL/DL configuration 128*a* for a serving cell. The serving cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. The UE signaling module 106 may receive signaling to configure the UE 102 with the cell. The signaling may indicate the primary TDD UL/DL configuration 128*a* for the serving cell. The UE signaling module 106 may receive the primary TDD UL/DL configuration 128*a* in one or more messages sent from an eNB 160.

The primary TDD UL/DL configuration 128*a* may be the default TDD UL/DL configuration for the serving cell. If the serving cell is a primary cell (PCell), the TDD UL/DL configuration signaled in a system information block (SIB) (e.g., SIB1) may be used as the primary TDD UL/DL configuration 128*a*. If the serving cell is a secondary cell (SCell), the TDD UL/DL configuration signaled in a radio resource control (RRC) message (e.g., RRCCommon) may be used as the primary TDD UL/DL configuration 128*a*.

The UE signaling module 106 may receive reconfiguration information 130*a* for the serving cell. The reconfiguration information 130*a* may include information obtained from configuration signaling and/or reconfiguration signaling. In a first approach, the reconfiguration information 130*a* may include explicit signaling that indicates a TDD reconfiguration to a secondary TDD UL/DL configuration. A TDD UL/DL configuration may be signaled to be the TDD UL/DL configuration in the next radio frame and/or after the reconfiguration transition. The reconfiguration information 130*a* may include PHY layer signaling or MAC layer signaling that may be used to indicate the actual TDD UL/DL configuration in the next radio frame for each reconfiguration.

In a second approach, the reconfiguration information 130*a* may include signaling that indicates supported TDD UL/DL configurations (e.g., a reconfiguration range). In this approach, an eIMTA cell may be configured with multiple configurations, which may be used to determine the TDD UL/DL configurations allowed (e.g., supported) for reconfiguration. The supported TDD UL/DL configurations may also be referred to as a reconfiguration range. The eIMTA cell may follow a separate DL-reference UL/DL configuration for DL HARQ-ACK timing, and a UL-reference TDD UL/DL configuration for UL timing. The same timing may be maintained for all reconfigurations within the defined reconfiguration range. The signaling that indicates supported TDD UL/DL configurations may be performed by an SIB and/or an RRC message.

The use of the subframes may be dynamically signaled by implicit signaling or explicit signaling. Explicit or implicit PHY signaling or MAC signaling may be applied for the UL/DL reconfiguration. The reconfiguration information 130*a* may include PHY signaling that indicates a transmission direction of a subframe.

The UE reference TDD UL/DL configuration module 126 may determine a reference TDD UL/DL configuration based on the primary TDD UL/DL configuration 128*a* and the reconfiguration information 130*a*. For example, the UE reference TDD UL/DL configuration module 126 may determine a DL-reference and a UL-reference TDD UL/DL configuration based on the primary TDD UL/DL configuration 128*a* and the reconfiguration information 130*a*. In one implementation, the UE reference TDD UL/DL configuration module 126 may determine DL-reference and UL-reference UL/DL configurations by referencing Table (1) and Table (2), as described below in connection with FIG. 2.

In an implementation associated with the first approach (e.g., explicit signaling of a secondary TDD UL/DL configuration), the reference TDD UL/DL configurations may be determined based on the primary TDD UL/DL configuration 128*a* and the secondary TDD UL/DL configuration. In one case, the primary TDD UL/DL configuration 128*a* may be used as either the DL-reference TDD UL/DL configuration or the UL-reference TDD UL/DL configuration. In another case, the DL-reference TDD UL/DL configuration may be determined based on the pair of the primary TDD UL/DL configuration 128*a* and the secondary TDD UL/DL configuration of an eIMTA cell by referring to Table (1) below. In another case, the secondary TDD UL/DL configuration may be used as the UL-reference TDD UL/DL configuration. In yet another case, the UL-reference TDD UL/DL configuration may be determined based on the pair of the primary TDD UL/DL configuration 128*a* and the secondary TDD UL/DL configuration of an eIMTA cell by referring to Table (2) below.

In an implementation associated with the second approach (e.g., signaling a reconfiguration range), the reference TDD UL/DL configurations may be determined based on the primary TDD UL/DL configuration 128*a* and the reconfiguration range. In one implementation, a DL limit TDD UL/DL configuration and a UL limit TDD UL/DL configuration may be determined based on the reconfiguration range included in the reconfiguration information 130*a*. The DL limit TDD UL/DL configuration may be the TDD UL/DL configuration with the maximum DL allocation in the reconfiguration range. The UL limit TDD UL/DL configuration may be the TDD UL/DL configuration with the maximum UL allocation in the reconfiguration range.

In one case, the UE reference TDD UL/DL configuration module 126 may determine the DL-reference TDD UL/DL configuration based on the pair of the primary TDD UL/DL configuration 128*a* and the DL limit TDD UL/DL configuration by referring to Table (1) below. In another case, the UL limit TDD UL/DL configuration may be used as the UL-reference UL/DL configuration. In yet another case, the UL-reference TDD UL/DL configuration may be determined based on the pair of the primary TDD UL/DL configuration 128*a* and the UL limit TDD UL/DL configuration of an eIMTA cell by referring to Table (2) below.

The UE operations module 124 may provide information 184 to the one or more receivers 120. For example, the UE operations module 124 may inform the receiver(s) 120 when to receive retransmissions. In some implementations, this may be based on the DL-reference TDD UL/DL configuration and/or the UL-reference TDD UL/DL configuration.

The UE operations module 124 may provide information 138 to the demodulator 114. For example, the UE operations module 124 may inform the demodulator 114 of a modulation pattern anticipated for transmissions from the eNB 160. In some implementations, this may be based on the DL-reference TDD UL/DL configuration and/or the UL-reference TDD UL/DL configuration.

The UE operations module 124 may provide information 136 to the decoder 108. For example, the UE operations module 124 may inform the decoder 108 of an anticipated encoding for transmissions from the eNB 160. In some implementations, this may be based on the DL-reference TDD UL/DL configuration and/or the UL-reference TDD UL/DL configuration.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some implementations, this may be based on the DL-reference TDD UL/DL configuration or UL-reference TDD UL/DL configuration (determined by the UE reference TDD UL/DL configuration module 126, for example). For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 168a-b. For example, a first eNB-decoded signal 168a may comprise received payload data, which may be stored in a data buffer 162. A second eNB-decoded signal 168b may comprise overhead data and/or control data. For example, the second eNB-decoded signal 168b may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include an eNB signaling module 164, an eNB reference TDD UL/DL configuration module 132, a primary TDD UL/DL configuration 128b and reconfiguration information 130b.

The eNB signaling module 164 may send a primary TDD UL/DL configuration 128b for a serving cell. The serving cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. The eNB signaling module 164 may send signaling to configure the UE 102 with the cell. The signaling may indicate the primary TDD UL/DL configuration 128b for the serving cell. The eNB signaling module 164 may send the primary TDD UL/DL configuration 128b in one or more messages.

The primary TDD UL/DL configuration 128b may be the default TDD UL/DL configuration for the serving cell. If the serving cell is a primary cell (PCell), the TDD UL/DL configuration signaled in a system information block (SIB) (e.g., SIB1) may be used as the primary TDD UL/DL configuration 128b. If the serving cell is a secondary cell (SCell), the TDD UL/DL configuration signaled in a radio resource control (RRC) message (e.g., RRCCommon) may be used as the primary TDD UL/DL configuration 128b.

The eNB signaling module 164 may send reconfiguration information 130b for the serving cell. In a first approach, the reconfiguration information 130b may include explicit signaling that indicates a TDD reconfiguration to a new secondary TDD UL/DL configuration. A TDD UL/DL configuration may be signaled to be the TDD UL/DL configuration in the next radio frame and/or after the reconfiguration transition. The reconfiguration information 130b may include PHY layer signaling or MAC layer signaling that may be used to indicate the actual TDD UL/DL configuration in the next radio frame for each reconfiguration.

In a second approach, the reconfiguration information 130b may include signaling that indicates supported TDD UL/DL configurations (e.g., a reconfiguration range). In this approach, an eIMTA cell may be configured with multiple configurations, which may be used to determine the reconfiguration range (e.g., the TDD UL/DL configurations allowed for reconfiguration). The eIMTA cell may follow a separate DL-reference UL/DL configuration for DL HARQ-ACK timing, and a UL-reference TDD UL/DL configuration for UL timing. The same timing may be maintained for all reconfigurations within the defined reconfiguration range. The signaling may be performed by an SIB and/or an RRC message.

The use of the subframes may be dynamically signaled by implicit signaling or explicit signaling. Explicit or implicit PHY signaling or MAC signaling may be applied for the UL/DL reconfiguration. The reconfiguration information 130b may include PHY signaling that indicates a transmission direction of a subframe.

The eNB reference TDD UL/DL configuration module 132 may determine a reference TDD UL/DL configuration based on the primary TDD UL/DL configuration 128b and the reconfiguration information 130*b*. For example, the eNB reference TDD UL/DL configuration module 132 may determine a DL-reference and a UL-reference TDD UL/DL configuration based on the primary TDD UL/DL configuration 128*b* and the reconfiguration information 130*b*. The eNB reference TDD UL/DL configuration module 132 may determine DL-reference and UL-reference UL/DL configurations by referencing Table (1) and Table (2), as described below in connection with FIG. 2.

In an implementation associated with the first approach (e.g., explicit signaling of a secondary TDD UL/DL configuration), the reference TDD UL/DL configurations may be determined based on the primary TDD UL/DL configuration 128*b* and the secondary TDD UL/DL configuration. In one case, the primary TDD UL/DL configuration 128*b* may be used as either the DL-reference TDD UL/DL configuration or the UL-reference TDD UL/DL configuration. In another case, the DL-reference TDD UL/DL configuration may be determined based on the pair of the primary TDD UL/DL configuration 128*b* and the secondary TDD UL/DL configuration of an eIMTA cell by referring to Table (1) below. In another case, the secondary TDD UL/DL configuration may be used as the UL-reference TDD UL/DL configuration. In yet another case, the UL-reference TDD UL/DL configuration may be determined based on the pair of the primary TDD UL/DL configuration 128*b* and the secondary TDD UL/DL configuration of an eIMTA cell by referring to Table (2) below.

In an implementation associated with the second approach (e.g., signaling a reconfiguration range), the reference TDD UL/DL configurations may be determined based on the primary TDD UL/DL configuration 128*b* and the reconfiguration range. In one implementation, a DL limit TDD UL/DL configuration and a UL limit TDD UL/DL configuration may be determined based on the reconfiguration range included in the reconfiguration information 130*b*. The DL limit TDD UL/DL configuration may be the TDD UL/DL configuration with the maximum DL allocation in the reconfiguration range. The UL limit TDD UL/DL configuration may be the TDD UL/DL configuration with the maximum UL allocation in the reconfiguration range.

In one case, the eNB reference TDD UL/DL configuration module 132 may determine the DL-reference TDD UL/DL configuration based on the pair of the primary TDD UL/DL configuration 128*b* and the DL limit TDD UL/DL configuration by referring to Table (1) below. In another case, the UL limit TDD UL/DL configuration may be used as the UL-reference UL/DL configuration. In yet another case, the UL-reference TDD UL/DL configuration may be determined based on the pair of the primary TDD UL/DL configuration 128*b* and the UL limit TDD UL/DL configuration of an eIMTA cell by referring to Table (2) below.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations corresponding to the DL-reference TDD UL/DL configuration.

The eNB operations module 182 may provide information 188 to the demodulator 172. For example, the eNB operations module 182 may inform the demodulator 172 of a modulation pattern anticipated for transmissions from the UE(s) 102. In some implementations, this may be based on the DL-reference TDD UL/DL configuration and/or the UL-reference TDD UL/DL configuration.

The eNB operations module 182 may provide information 186 to the decoder 166. For example, the eNB operations module 182 may inform the decoder 166 of an anticipated encoding for transmissions from the UE(s) 102. In some implementations, this may be based on the DL-reference TDD UL/DL configuration and/or the UL-reference TDD UL/DL configuration.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. In some implementations, this may be based on the DL-reference TDD UL/DL configuration and/or the UL-reference TDD UL/DL configuration.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a DL-reference TDD UL/DL configuration. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
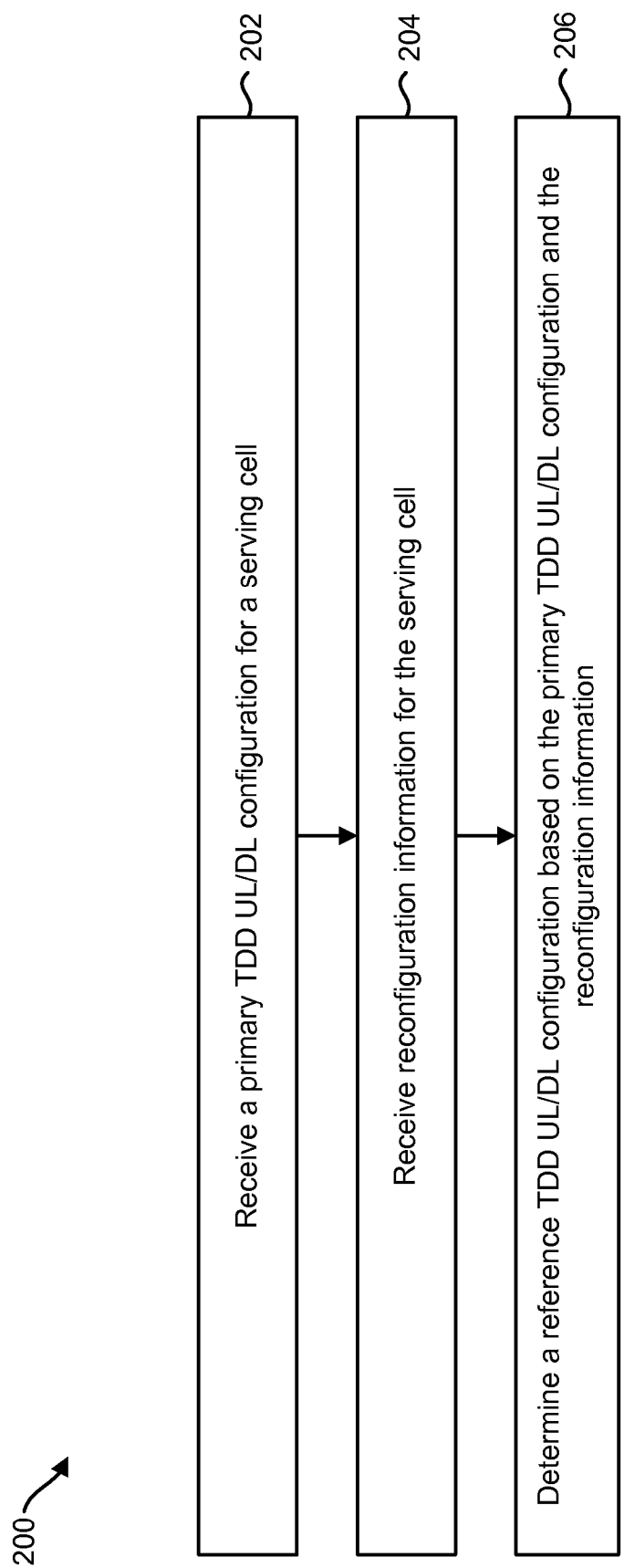
FIG. 2 is a flow diagram illustrating one implementation of a method for signaling reference configurations by a UE.

FIG. 2 is a flow diagram illustrating one implementation of a method 200 for signaling reference configurations by a UE 102. The UE 102 may be configured with dynamic TDD UL/DL reconfiguration support (e.g., eIMTA support). The UE 102 may receive 202 a primary TDD UL/DL configuration 128 for a serving cell. The serving cell may be a dynamic TDD UL/DL reconfiguration cell (e.g., an eIMTA cell).

If the serving cell is a primary cell (PCell), the TDD UL/DL configuration signaled in a system information block (SIB) (e.g., SIB1) may be used as the primary TDD UL/DL configuration 128. If the serving cell is a secondary cell (SCell), the TDD UL/DL configuration signaled in a radio resource control (RRC) message (e.g., RRCCommon) may be used as the primary TDD UL/DL configuration 128. To reduce complexity, the primary TDD UL/DL configuration 128 may be used to determine the reference configurations of an eIMTA cell. Therefore, there may be a common reference TDD UL/DL configuration on either the DL-reference UL/DL configuration or the UL-reference UL/DL configuration between legacy UEs 102 and Release-12 and beyond UEs 102.

The UE 102 may receive 204 reconfiguration information 130 for the serving cell. In LTE Release-11, inter-band TDD carrier aggregation with different UL/DL configurations is supported. To maintain backward compatibility, the PCell DL and UL timing may be kept the same as previous releases. For the SCell, a DL-reference UL/DL configuration may be determined for PDSCH HARQ-ACK timing, and a UL-reference configuration may be determined for PUSCH scheduling and HARQ-ACK timing.

In carrier aggregation, a DL-reference TDD UL/DL configuration for the serving cell may be determined for a primary cell and a secondary cell. According to Release-11, if the UE 102 is configured with more than one serving cell and if at least two serving cells have different TDD UL/DL configurations and if a serving cell is a primary cell, then the primary cell (e.g., PCell) TDD UL/DL configuration is the DL-reference UL/DL configuration for the serving cell.

Additionally, according to Release-11, if a serving cell is a secondary cell (e.g., SCell) and at least two serving cells have different TDD UL/DL configurations, the DL-reference TDD UL/DL configuration may be decided by the combination of a PCell and SCell TDD UL/DL configurations. In one TDD carrier aggregation (CA) implementation, the pair formed by a PCell UL/DL configuration and the SCell UL/DL configuration belongs to Set 1 in Table (1) (from Table 10.2-1 of 3GPP TS 36.213) below. In this implementation, the DL-reference UL/DL configuration for the serving cell is defined in the corresponding set in Table (1). Table (1) may be used as a lookup table to determine a DL-reference TDD UL/DL configuration.

TABLE (1)

| Set # | (Primary cell TDD UL/DL configuration, Secondary cell TDD UL/DL configuration) | DL-reference TDD UL/DL configuration |
|---|---|---|
| Set 1 | (0, 0) | 0 |
|  | (1, 0), (1, 1), (1, 6) | 1 |
|  | (2, 0), (2, 2), (2, 1) (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

In another TDD CA implementation in which a serving cell is a secondary cell and at least two serving cells have different UL/DL configurations, the UE 102 is not configured to monitor a physical downlink control channel (PDCCH) or enhanced physical downlink control channel (EPDCCH) with a carrier indicator field for the serving cell. If the pair formed by a PCell TDD UL/DL configuration and the SCell TDD UL/DL configuration belongs to Set 2 or Set 3 in Table (1), then the DL-reference TDD UL/DL configuration for the serving cell is also defined in the corresponding set in Table (1).

In yet another TDD CA implementation in which a serving cell is a secondary cell and at least two serving cells have different TDD UL/DL configurations, the UE 102 is configured to monitor a PDCCH or EPDCCH with a carrier indicator field for the serving cell. If the pair formed by a PCell TDD UL/DL configuration and the SCell TDD UL/DL configuration belongs to Set 4 or Set 5 in Table (1), then the DL-reference TDD UL/DL configuration for the serving cell is defined for the corresponding set in Table (1).

In carrier aggregation, a UL-reference TDD UL/DL configuration for the serving cell may also be determined for a primary cell and a secondary cell. According to Release-11, if the UE 102 is configured with more than one serving cell and if at least two serving cells have different TDD UL/DL configurations and if a serving cell is a primary cell or if the UE 102 is not configured to monitor PDCCH or EPDCCH with a carrier indicator field for the serving cell, then the serving cell TDD UL/DL configuration is the UL-reference TDD UL/DL configuration.

Additionally, according to Release-11, if a UE 102 is configured with more than one serving cell, and if a serving cell is a secondary cell (SCell) and at least two serving cells have different TDD UL/DL configurations, and if the UE 102 is configured to monitor PDCCH or EPDCCH with a carrier indicator field corresponding to another serving cell (e.g., the other serving cell), then the UL-reference TDD UL/DL configuration may be decided by the combination of the other serving cell and the serving cell TDD UL/DL configurations. In one TDD CA implementation, the UL-reference UL/DL configuration of the serving cell is defined by Table (2) (from Table 8-0A of 3GPP TS 36.213) based on the pair formed by the other serving cell TDD UL/DL configuration and the serving cell TDD UL/DL configuration. Table (2) may be used as a lookup table to determine a UL-reference TDD UL/DL configuration.

TABLE (2)

| Set # | (Other serving cell TDD UL/DL configuration, Serving cell TDD UL/DL configuration) | UL-reference TDD UL/DL configuration |
|---|---|---|
| Set 1 | (1, 1), (1, 2), (1, 4), (1, 5) | 1 |
|  | (2, 2), (2, 5) | 2 |

TABLE (2)-continued

| Set # | (Other serving cell TDD UL/DL configuration, Serving cell TDD UL/DL configuration) | UL-reference TDD UL/DL configuration |
|---|---|---|
|  | (3, 3), (3, 4), (3, 5) | 3 |
|  | (4, 4), (4, 5) | 4 |
|  | (5, 5) | 5 |
| Set 2 | (1, 0), (2, 0), (3, 0), (4, 0), (5, 0) | 0 |
|  | (2, 1), (4, 1), (5, 1) | 1 |
|  | (5, 2) | 2 |
|  | (4, 3), (5, 3) | 3 |
|  | (5, 4) | 4 |
|  | (1, 6), (2, 6), (3, 6), (4, 6), (5, 6) | 6 |
| Set 3 | (3, 1) | 1 |
|  | (3, 2), (4, 2) | 2 |
|  | (1, 3), (2, 3) | 3 |
|  | (2, 4) | 4 |
| Set 4 | (0, 0), (6, 0) | 0 |
|  | (0, 1), (0, 2), (0, 4), (0, 5), (6, 1), (6, 2), (6, 5) | 1 |
|  | (0, 3), (6, 3) | 3 |
|  | (6, 4) | 4 |
|  | (0, 6), (6, 6) | 6 |

With dynamic TDD UL/DL reconfiguration (e.g., eIMTA), it is desirable to achieve a smooth transition (e.g., reconfiguration) between TDD UL/DL configurations. Therefore, to reduce the impact of a reconfiguration, existing TDD UL/DL configuration timings may be utilized. According to the systems and methods described herein, two approaches may be used to facilitate dynamic TDD UL/DL reconfiguration. The first approach may include explicit signaling of a new (e.g., secondary) TDD UL/DL configuration, and then performing a transition from the old TDD UL/DL configuration to the new TDD UL/DL configuration. A second approach may include signaling a range of TDD UL/DL configurations for reconfiguration (e.g., a reconfiguration range), deriving reference configurations, and then following the reference configurations to achieve different TDD UL/DL subframe allocations. These two approaches are discussed in more detail below.

With the first approach (e.g., explicit signaling of a secondary TDD UL/DL configuration), the transition behavior may be specified. For example, during the transition period, the association timing may be changed from the old TDD UL/DL configuration to the new TDD UL/DL configuration. In one implementation of this approach, the reconfiguration information 130 may include explicit signaling that indicates a TDD reconfiguration to a secondary TDD UL/DL configuration. For instance, PHY layer signaling or MAC layer signaling may be used to indicate the actual (secondary) TDD UL/DL configuration in the next radio frame for each reconfiguration. The explicit signaling may be a new signal, a new or existing PDCCH or EPDCCH and/or a DCI format. In one implementation, after the transition, the new TDD UL/DL configuration may be used for DL and UL operations and HARQ-ACK timing. In another implementation, a DL-reference TDD UL/DL configuration and a UL-reference TDD UL/DL configuration may be used with explicit PHY layer signaling and/or MAC layer signaling with the TDD UL/DL reconfiguration.

With the second approach (e.g., signaling a reconfiguration range), the HARQ-ACK timing may be kept unchanged for TDD reconfiguration within the reconfiguration range. For example, extra signaling (e.g. RRC signaling) may be used to define a set of TDD UL/DL configurations of the reconfiguration range. In this approach, an eIMTA cell configuration may be performed before a reconfiguration. The UE 102 may be configured with multiple secondary TDD UL/DL configurations. The UE 102 may determine the TDD UL/DL configurations allowed (e.g., supported) for reconfiguration. The allowed TDD UL/DL configurations may be referred to as the reconfiguration range. Therefore, in this approach, reconfiguration information 130 may include signaling that indicates supported TDD UL/DL configurations (e.g., the reconfiguration range). Furthermore, with this approach, the HARQ-ACK timing references (e.g., the DL-reference and UL-reference TDD UL/DL configurations) may be independently determined from the reconfiguration signaling.

In either approach, the use of the subframes may be dynamically signaled by implicit signaling or explicit signaling. Explicit or implicit PHY layer signaling or MAC layer signaling may be applied for the TDD UL/DL reconfiguration. The reconfiguration information 130 may include the PHY layer signaling that indicates a transmission direction of a subframe. In one implementation, explicit signaling (e.g., PHY layer signaling or MAC layer signaling) may be used to indicate the actual TDD UL/DL configuration in the next radio frame for each reconfiguration. Therefore, in this implementation, the use of a subframe in a radio frame is fixed based on the TDD UL/DL configuration signaled by the explicit signaling.

In another implementation, the UE 102 may use a given subframe following an implicit signaling of the subframe direction. The implicit signaling may include PHY layer signaling. Furthermore, the implicit signaling may use existing PDCCH, EPDCCH and/or DCI formats (e.g. a UL grant and a DL scheduling). In this implementation, because the subframe direction is not explicitly signaled to other UEs 102, the UE 102 behavior may be defined to consider possible misdetection and error conditions.

In yet another implementation, the UE 102 may use a given subframe following an explicit signaling of the subframe direction. The explicit signaling may include a new PHY layer signal, a new or existing PDCCH or EPDCCH and/or a DCI format. The explicit signaling may indicate the subframe direction of a flexible subframe, therefore the UE 102 behavior may be better defined than with the implicit signaling implementation.

The implicit or explicit signaling of subframe direction may provide improved flexibility for subframe allocation and usage. Furthermore, no additional PHY layer signaling may be needed to indicate the actual TDD UL/DL configuration in each radio frame.

The UE 102 may determine 206 a reference TDD UL/DL configuration based on the primary TDD UL/DL configuration 128 and the reconfiguration information 130. For example, the UE 102 may determine 206 a DL-reference and a UL-reference TDD UL/DL configuration based on the primary TDD UL/DL configuration 128 and the reconfiguration information 130.

The UE 102 may determine 206 DL-reference and UL-reference UL/DL configurations by referencing Table (1) and Table (2), which are currently defined for inter-band TDD CA in Release-11. Because multiple reference timings are already supported in inter-band TDD CA in Release-11, these reference timings may be applied to an eIMTA cell. The described systems and methods may be used for both reconfiguration signaling approaches discussed above (e.g., explicit signaling of a secondary TDD UL/DL configuration and signaling a reconfiguration range).

In one implementation associated with the first approach (e.g., explicit signaling of a secondary TDD UL/DL configuration), a reconfiguration may be signaled by explicit PHY layer signaling or MAC layer signaling. A TDD UL/DL configuration may be signaled to be the TDD UL/DL configuration in the next radio frame and/or after the reconfiguration transition. The signaled TDD UL/DL configuration may be referred to as the secondary TDD UL/DL configuration. Therefore, in this implementation, the reconfiguration information 130 may include the explicit signaling that indicates a TDD reconfiguration to a secondary TDD UL/DL configuration. Because the actual TDD UL/DL configuration is known, there may be no need to signal an extra eIMTA cell TDD UL/DL configuration at a higher layer (e.g., RRC). To minimize the impact during the transition, a DL-reference UL/DL configuration and a UL-reference UL/DL configuration may be applied during the transition and may be used after the transition of each reconfiguration.

The DL-reference UL/DL configuration and the UL-reference TDD UL/DL configuration may be determined 206 based on the primary TDD UL/DL configuration 128 and the secondary TDD UL/DL configuration of an eIMTA serving cell. In one implementation, the primary TDD UL/DL configuration 128 may be used as either the DL-reference TDD UL/DL configuration or the UL-reference TDD UL/DL configuration. This implementation may make the transition easier because only one association timing may be reconfigured.

In another implementation, the DL-reference TDD UL/DL configuration may be determined 206 based on the pair of the primary TDD UL/DL configuration 128 and the secondary TDD UL/DL configuration of an eIMTA cell by referring to Table (1) above. For example, the pair (Primary TDD UL/DL configuration, Secondary TDD UL/DL configuration) may be used as the input for (Primary cell TDD UL/DL configuration, Secondary cell TDD UL/DL configuration) in Table (1) to determine 206 the DL-reference TDD UL/DL configuration.

In one case, because both the primary and the secondary TDD UL/DL configurations are for the same eIMTA cell, only set 1, set 2 and set 3 in Table (1) are used to determine 206 the DL-reference TDD UL/DL configuration. This implementation may be similar to a self-scheduling case for inter-band TDD CA with different TDD UL/DL configurations.

In another case, set 1, set 4 and set 5 in Table (1) are used to determine 206 the DL-reference TDD UL/DL configuration. This implementation may be similar to a cross-scheduling case for inter-band TDD CA with different TDD UL/DL configurations. In this implementation, the primary TDD UL/DL configuration 128 may be treated as a scheduling cell TDD UL/DL configuration.

The UL-reference TDD UL/DL configuration may also be determined 206 based on the primary TDD UL/DL configuration 128 and the secondary TDD UL/DL configuration of an eIMTA cell. In one implementation, the secondary TDD UL/DL configuration may be used as the UL-reference UL/DL configuration. This implementation may be similar to a self-scheduling case for inter-band TDD CA with different TDD UL/DL configurations.

In another implementation, the UL-reference TDD UL/DL configuration may be determined 206 based on the pair of the primary TDD UL/DL configuration 128 and the secondary TDD UL/DL configuration of an eIMTA cell by referring to Table (2) above. For example, the pair (Primary TDD UL/DL configuration, Secondary TDD UL/DL configuration) may be used as the input for (Other serving cell TDD UL/DL configuration, Serving cell TDD UL/DL configuration) in Table (2) to determine 206 the UL-reference TDD UL/DL configuration. In this implementation, the primary TDD UL/DL configuration 128 may be treated as a scheduling cell TDD UL/DL configuration.

In another implementation associated with the second approach (e.g., signaling a reconfiguration range), the DL-reference UL/DL configuration and the UL-reference TDD UL/DL configuration may be determined 206 based on the primary TDD UL/DL configuration 128 and the reconfiguration range. In this implementation, an eIMTA cell may follow a separate DL-reference TDD UL/DL configuration for DL HARQ-ACK timing, and a UL-reference TDD UL/DL configuration for UL timing. Furthermore, the same timing may be maintained for all reconfigurations within the defined reconfiguration range. The reconfiguration signaling (e.g., PHY layer or MAC layer reconfiguration signaling) may be performed implicitly or explicitly for a flexible subframe (e.g., a subframe that can change allocation direction).

In this implementation, configuration signaling may be performed by an SIB (e.g., SIB1) and/or RRC message that indicates supported TDD UL/DL configurations (e.g., the reconfiguration range) for the cell. The supported TDD UL/DL configurations may include a DL limit TDD UL/DL configuration. The DL limit TDD UL/DL configuration may be a TDD UL/DL configuration with the same or more DL subframes, which include any subframe that is a DL in the set of UL/DL configurations allowed for reconfiguration. Therefore, the DL limit TDD UL/DL configuration may be the TDD UL/DL configuration with the maximum DL allocation in the reconfiguration range.

The supported TDD UL/DL configurations may also include a UL limit TDD UL/DL configuration. The UL limit TDD UL/DL configuration is a TDD UL/DL configuration with the same or more UL subframes, which include any subframe that is an UL in the set of UL/DL configurations allowed for reconfiguration. Therefore, UL limit TDD UL/DL configuration may be the TDD UL/DL configuration with the maximum UL allocation in the reconfiguration range.

The UE 102 may determine 206 the DL-reference TDD UL/DL configuration based on the pair of the primary TDD UL/DL configuration 128 and the DL limit TDD UL/DL configuration of an eIMTA cell by referring to Table (1) above. For example, the pair (Primary TDD UL/DL configuration, DL limit TDD UL/DL configuration) may be used as the input for (Primary cell TDD UL/DL configuration, Secondary cell TDD UL/DL configuration) in Table (1) to determine 206 the DL-reference TDD UL/DL configuration.

In one implementation, only set 1, set 2 and set 3 in Table (1) are used to determine 206 the DL-reference TDD UL/DL configuration. This implementation may be similar to a self-scheduling case for inter-band TDD CA with different TDD UL/DL configurations.

In another implementation, set 1, set 4 and set 5 in Table (1) are used to determine the DL-reference UL/DL configuration. This implementation may be similar to a cross-scheduling case for inter-band TDD CA with different TDD UL/DL configurations. In this implementation, the primary TDD UL/DL configuration 128 may be treated as a scheduling cell TDD UL/DL configuration.

The UL-reference TDD UL/DL configuration may also be determined 206 based on the primary TDD UL/DL configuration 128 and the UL limit TDD UL/DL configuration of an eIMTA cell. In one implementation, the UL limit TDD UL/DL configuration may be used as the UL-reference UL/DL configuration. This implementation may be similar to a self-scheduling case for inter-band TDD CA with different TDD UL/DL configurations.

In another implementation, the UL-reference TDD UL/DL configuration may be determined 206 based on the pair of the primary TDD UL/DL configuration 128 and the UL limit TDD UL/DL configuration of an eIMTA cell by referring to Table (2) above. For example, the pair (Primary TDD UL/DL configuration, Secondary TDD UL/DL configuration) may be used as the input for (Other serving cell TDD UL/DL configuration, Serving cell TDD UL/DL configuration) in Table (2) to determine 206 the UL-reference TDD UL/DL configuration. In this implementation, the primary TDD UL/DL configuration 128 may be treated as a scheduling cell TDD UL/DL configuration.

It should be noted that with the second approach, the eIMTA cell configuration may be separate from the eIMTA cell reconfiguration. Therefore, with the second approach, the DL-reference TDD UL/DL configuration and the UL-reference TDD UL/DL configuration may be determined 206 based on the eIMTA cell configuration signaling instead of, or in addition to, the eIMTA cell reconfiguration signaling. An eIMTA cell reconfiguration may occur when eIMTA cell reconfiguration signaling is sent by the eNB 160 and/or received by the UE 102. As used herein, the term "reconfiguration information" may include configuration signaling, reconfiguration signaling or a combination of configuration signaling and reconfiguration signaling. Therefore, for the second approach, the DL-reference TDD UL/DL configuration and the UL-reference TDD UL/DL configuration may be determined 206 based on the primary TDD UL/DL configuration 128 and reconfiguration information (which may include eIMTA cell configuration signaling).

Both explicit and implicit reconfiguration signaling may be used under the second approach to indicate a TDD reconfiguration. In one implementation, explicit PHY layer or MAC layer signaling may indicate the TDD UL/DL configuration for a reconfiguration. The signaled TDD UL/DL configuration is a secondary TDD UL/DL configuration, and may be selected from the set of TDD UL/DL configurations allowed for reconfiguration (e.g., the reconfiguration range). In another implementation, explicit PHY layer signaling may indicate the direction of a flexible subframe. In yet another implementation, implicit PHY layer signaling may indicate the direction of a flexible subframe.

Figure 3:
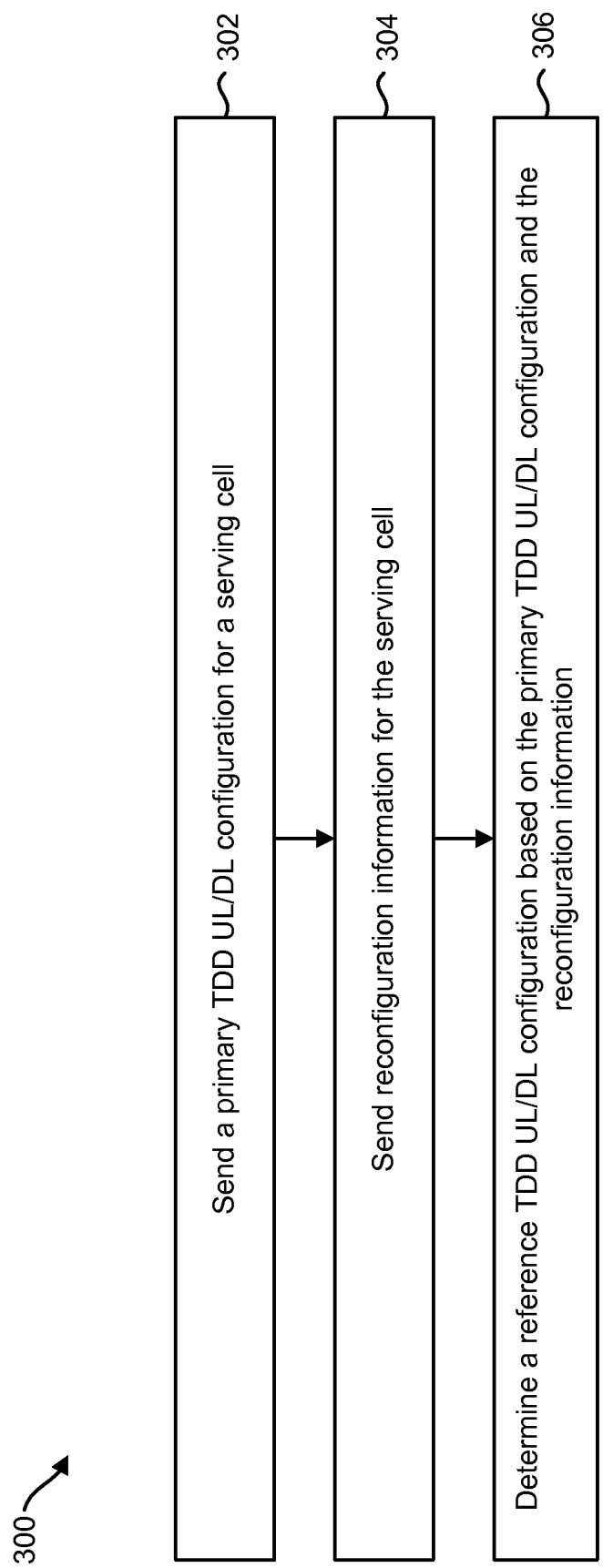
FIG. 3 is a flow diagram illustrating one implementation of a method for signaling reference configurations by an eNB.

FIG. 3 is a flow diagram illustrating one implementation of a method 300 for signaling reference configurations by an eNB 160. The eNB 160 may be configured with dynamic TDD UL/DL reconfiguration (e.g., eIMTA support). The eNB 160 may send 302 a primary TDD UL/DL configuration 128 for a serving cell.

The serving cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. The eNB 160 may send signaling to configure the UE 102 with the cell. The signaling may indicate the primary TDD UL/DL configuration 128 for the serving cell. The eNB 160 may send 302 the primary TDD UL/DL configuration 128 in one or more messages.

The primary TDD UL/DL configuration 128 may be the default TDD UL/DL configuration for the serving cell. If the serving cell is a primary cell (PCell), the TDD UL/DL configuration signaled in a system information block (SIB) (e.g., SIB1) may be used as the primary TDD UL/DL configuration 128. If the serving cell is a secondary cell (SCell), the TDD UL/DL configuration signaled in a radio resource control (RRC) message (e.g., RRCCommon) may be used as the primary TDD UL/DL configuration 128.

The eNB 160 may send 304 reconfiguration information 130 for the serving cell. In a first approach, the reconfiguration information 130 may include explicit signaling that indicates a TDD reconfiguration to a new secondary TDD UL/DL configuration. A TDD UL/DL configuration may be signaled to be the TDD UL/DL configuration in the next radio frame and/or after the reconfiguration transition. The reconfiguration information 130 may include PHY layer signaling or MAC layer signaling that may be used to indicate the actual TDD UL/DL configuration in the next radio frame for each reconfiguration.

In a second approach, the reconfiguration information 130 may include a reconfiguration range. In this approach, an eIMTA cell may be configured with multiple configurations, which may be used to determine the TDD UL/DL configurations allowed for reconfiguration (e.g., the reconfiguration range). In this approach, the eIMTA cell may follow a separate DL-reference UL/DL configuration for DL HARQ-ACK timing, and a UL-reference TDD UL/DL configuration for UL timing. The same timing may be maintained for all reconfigurations within the defined reconfiguration range. Therefore, extra signaling may be used to define the reconfiguration range. The signaling may be performed by an SIB and/or an RRC message.

The use of the subframes may be dynamically signaled by implicit signaling or explicit signaling. Explicit or implicit PHY signaling or MAC signaling may be applied for the UL/DL reconfiguration. The reconfiguration information 130 may include PHY signaling that indicates a transmission direction of a subframe.

The eNB 160 may determine 306 a reference TDD UL/DL configuration based on the primary TDD UL/DL configuration 128 and the reconfiguration information 130. For example, the eNB 160 may determine 306 a DL-reference and a UL-reference TDD UL/DL configuration based on the primary TDD UL/DL configuration 128 and the reconfiguration information 130. The eNB 160 may determine 306 DL-reference and UL-reference UL/DL configurations by referring to Table (1) and Table (2), as described above in connection with FIG. 2.

In an implementation associated with the first approach (e.g., explicit signaling of a secondary TDD UL/DL configuration), the reference TDD UL/DL configurations may be determined 306 based on the primary TDD UL/DL configuration 128 and the secondary TDD UL/DL configuration. In one case, the primary TDD UL/DL configuration 128 may be used as either the DL-reference TDD UL/DL configuration or the UL-reference TDD UL/DL configuration. In another case, the DL-reference TDD UL/DL configuration may be determined 306 based on the pair of the primary TDD UL/DL configuration 128 and the secondary TDD UL/DL configuration of an eIMTA cell by referring to Table (1) above. In another case, the secondary TDD UL/DL configuration may be used as the UL-reference TDD UL/DL configuration. In yet another case, the UL-reference TDD UL/DL configuration may be determined 306 based on the pair of the primary TDD UL/DL configuration 128 and the secondary TDD UL/DL configuration of an eIMTA cell by referring to Table (2) above.

In an implementation associated with the second approach (e.g., signaling a reconfiguration range), the reference TDD UL/DL configurations may be determined 306 based on the primary TDD UL/DL configuration 128 and the reconfiguration range. In one implementation, a DL limit TDD UL/DL configuration and a UL limit TDD UL/DL configuration may be determined 306 based on the reconfiguration range included in the reconfiguration information 130. The DL limit TDD UL/DL configuration may be the TDD UL/DL configuration with the maximum DL allocation in the reconfiguration range. The UL limit TDD UL/DL configuration may be the TDD UL/DL configuration with the maximum UL allocation in the reconfiguration range.

In one case, the eNB 160 may determine 306 the DL-reference TDD UL/DL configuration based on the pair of the primary TDD UL/DL configuration 128 and the DL limit TDD UL/DL configuration by referring to Table (1) above. In another case, the UL limit TDD UL/DL configuration may be used as the UL-reference UL/DL configuration. In yet another case, the UL-reference TDD UL/DL configuration may be determined 306 based on the pair of the primary TDD UL/DL configuration 128 and the UL limit TDD UL/DL configuration of an eIMTA cell by referring to Table (2) above.

Figure 4:
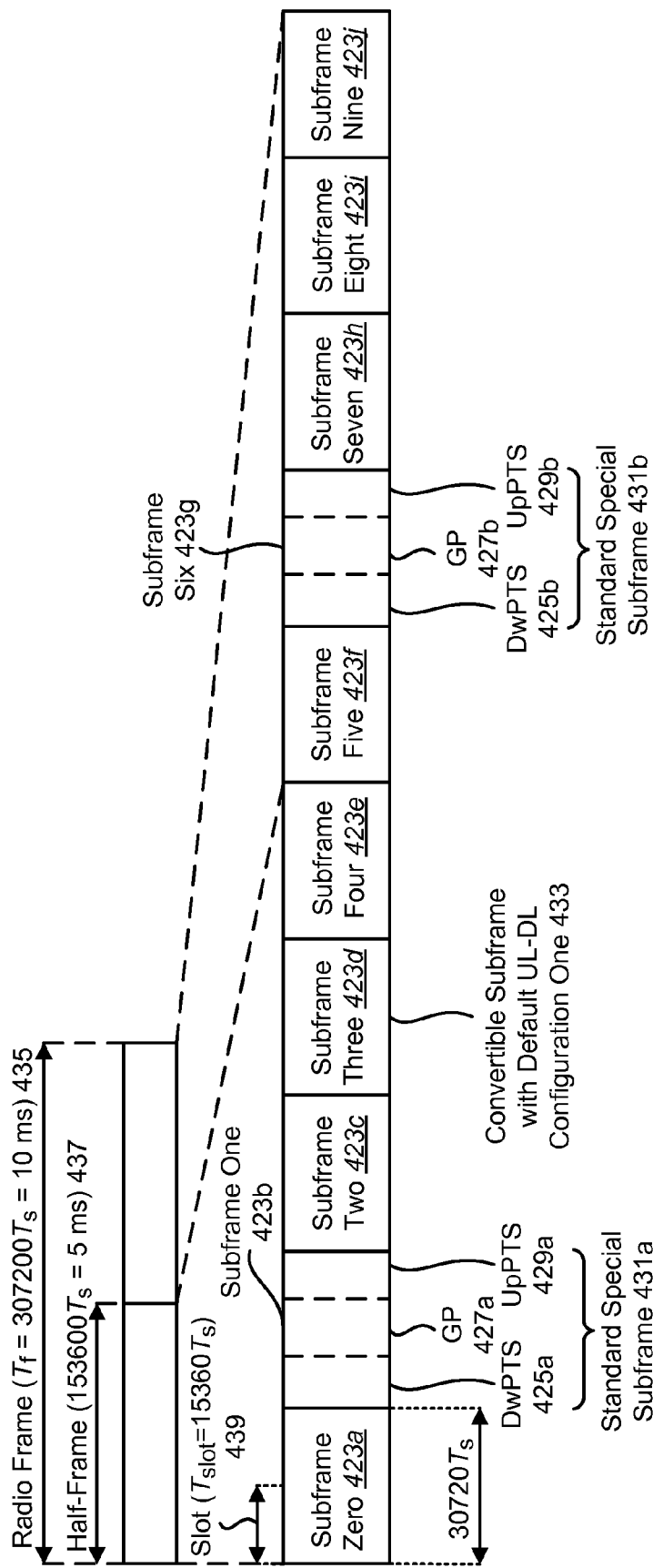
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s = 5$ ms. Each half-frame 437 may include five subframes 423*a-e*, 423*f-j* each having a length of $30720 \cdot T_s = 1$ ms.

TDD UL/DL configurations 0-6 are given below in Table (3) (from Table 4.2-2 in 3GPP TS 36.211). TDD UL/DL configurations with both 5 ms and 10 ms downlink-to-uplink switch-point periodicity may be supported. In particular, seven TDD UL/DL configurations are specified in 3GPP specifications, as shown in Table (3) below. In Table (3), "D" denotes a downlink subframe, "S" denotes a special subframe and "U" denotes a UL subframe.

TABLE (3)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (3) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (4) (from Table 4.2-1 of 3GPP TS 36.211) subject to the total length of DwPTS, GP and UpPTS being equal to $30720 \cdot T_s = 1$ ms. Table (4) illustrates several configurations of (standard) special subframes. Each subframe i is defined as two slots, 2i and 2i+1 of length $T_{slot} = 15360 \cdot T_s = 0.5$ ms in each subframe. In Table (4), "cyclic prefix" is abbreviated as "CP" and "configuration" is abbreviated as "Config" for convenience.

TABLE (4)

| | | Normal CP in downlink | | | Extended CP in downlink | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (4) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot 439.

TDD UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431a-b. In the case of 10 ms downlink-to-uplink switch-point periodicity, a special subframe may exist in the first half-frame 437 only.

Subframe zero (e.g., 0) 423a and subframe five (e.g., 5) 423f and DwPTS 425a-b may be reserved for DL transmission. The UpPTS 429a-b and the subframe(s) immediately following the standard special subframe(s) 431a-b (e.g., subframe two 423c and subframe seven 423h) may be reserved for UL transmission. In one implementation, in a case where multiple cells are aggregated, a UE 102 may assume the same TDD UL/DL configuration across all the cells and that the guard period (GP) of the special subframe(s) in the different cells have an overlap of at least $1456 \cdot T_s$.

Enhanced interference mitigation with traffic adaptation (eIMTA) is a major topic for TDD LTE networks to enable more flexible use of spectrum using dynamic UL/DL allocation. Therefore, some subframes may be flexible and convertible (e.g., flexible subframes) and can be used as either a downlink subframe, an uplink subframe or a special subframe. Some subframes may not be flexible or convertible (e.g., fixed subframes). From the DL HARQ-ACK timing point of view, a special subframe is viewed as a DL subframe. One or more of the subframes 423 illustrated in FIG. 4 may be convertible, depending on the TDD UL/DL reconfiguration range. Assuming a default TDD UL/DL configuration 1 as given in Table (3) above, for example, subframe three (e.g., 3) 423d may be a convertible subframe 433 (from UL-to-DL, for instance).

Figure 5:
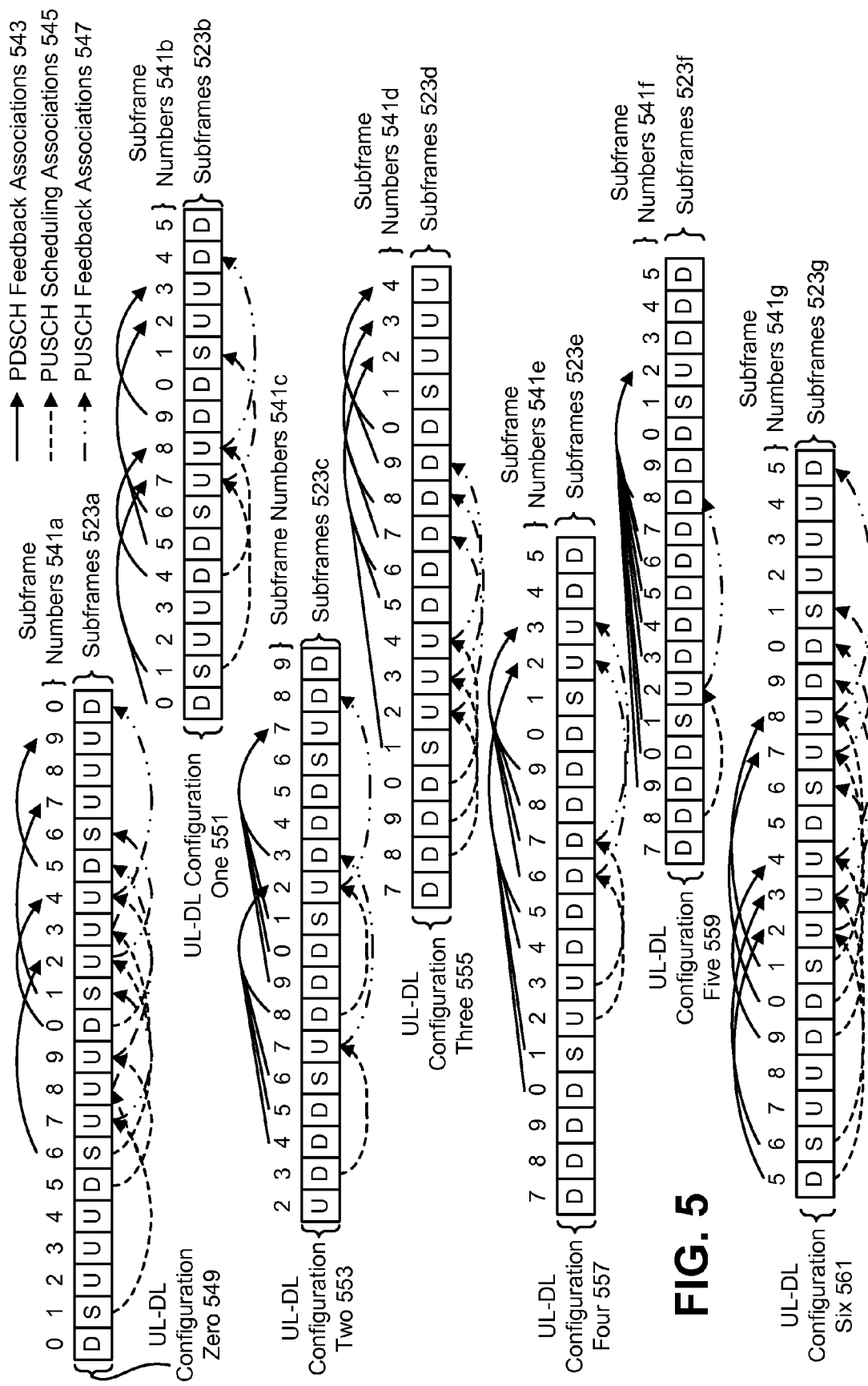
FIG. 5 is a diagram illustrating some time-division duplexing (TDD) uplink/downlink (UL/DL) configurations in accordance with the systems and methods described herein.

FIG. 5 is a diagram illustrating some TDD UL/DL configurations 549, 551, 553, 555, 557, 559, 561 in accordance with the systems and methods described herein. In particular, FIG. 5 illustrates TDD UL/DL configuration zero 549 (e.g., "TDD UL/DL configuration 0") with subframes 523a and subframe numbers 541a, TDD UL/DL configuration one 551 (e.g., "TDD UL/DL configuration 1") with subframes 523b and subframe numbers 541b, TDD UL/DL configuration two 553 (e.g., "TDD UL/DL configuration 2") with subframes 523c and subframe numbers 541c and TDD UL/DL configuration three 555 (e.g., "TDD UL/DL configuration 3") with subframes 523d and subframe numbers 541d. FIG. 5 also illustrates TDD UL/DL configuration four 557 (e.g., "TDD UL/DL configuration 4") with subframes 523e and subframe numbers 541e, TDD UL/DL configuration five 559 (e.g., "TDD UL/DL configuration 5") with subframes 523f and subframe numbers 541f and TDD UL/DL configuration six 561 (e.g., "TDD UL/DL configuration 6") with subframes 523g and subframe numbers 541g.

Furthermore, FIG. 5 illustrates PDSCH feedback associations 543 (e.g., PDSCH HARQ-ACK feedback on PUCCH or PUSCH associations), PUSCH scheduling associations 545 (e.g., downlink scheduling for PUSCH transmission associations) and PUSCH feedback associations 547 (e.g., PUSCH HARQ-ACK feedback on PHICH or PDCCH associations) corresponding to each TDD UL/DL configuration. It should be noted that some of the radio frames illustrated in FIG. 5 have been truncated for convenience.

The systems and methods may be applied to one or more of the TDD UL/DL configurations 549, 551, 553, 555, 557, 559, 561 illustrated in FIG. 5. For example, one or more PDSCH feedback associations 543 corresponding to one of the TDD UL/DL configurations illustrated in FIG. 5 may be applied to communications between a (Release-12) UE 102 and eNB 160 when determined as a DL-reference TDD UL/DL configuration. Additionally or alternatively, one or more PUSCH scheduling associations 545 corresponding to one of the TDD UL/DL configurations illustrated in FIG. 5 may be applied to communications between a UE 102 and eNB 160 when determined as a UL-reference TDD UL/DL configuration. Additionally or alternatively, one or more PUSCH feedback associations 547 corresponding to one of the TDD UL/DL configurations illustrated in FIG. 5 may be applied to communications between a UE 102 and eNB 160 when determined as a UL-reference TDD UL/DL configuration.

Figure 6:
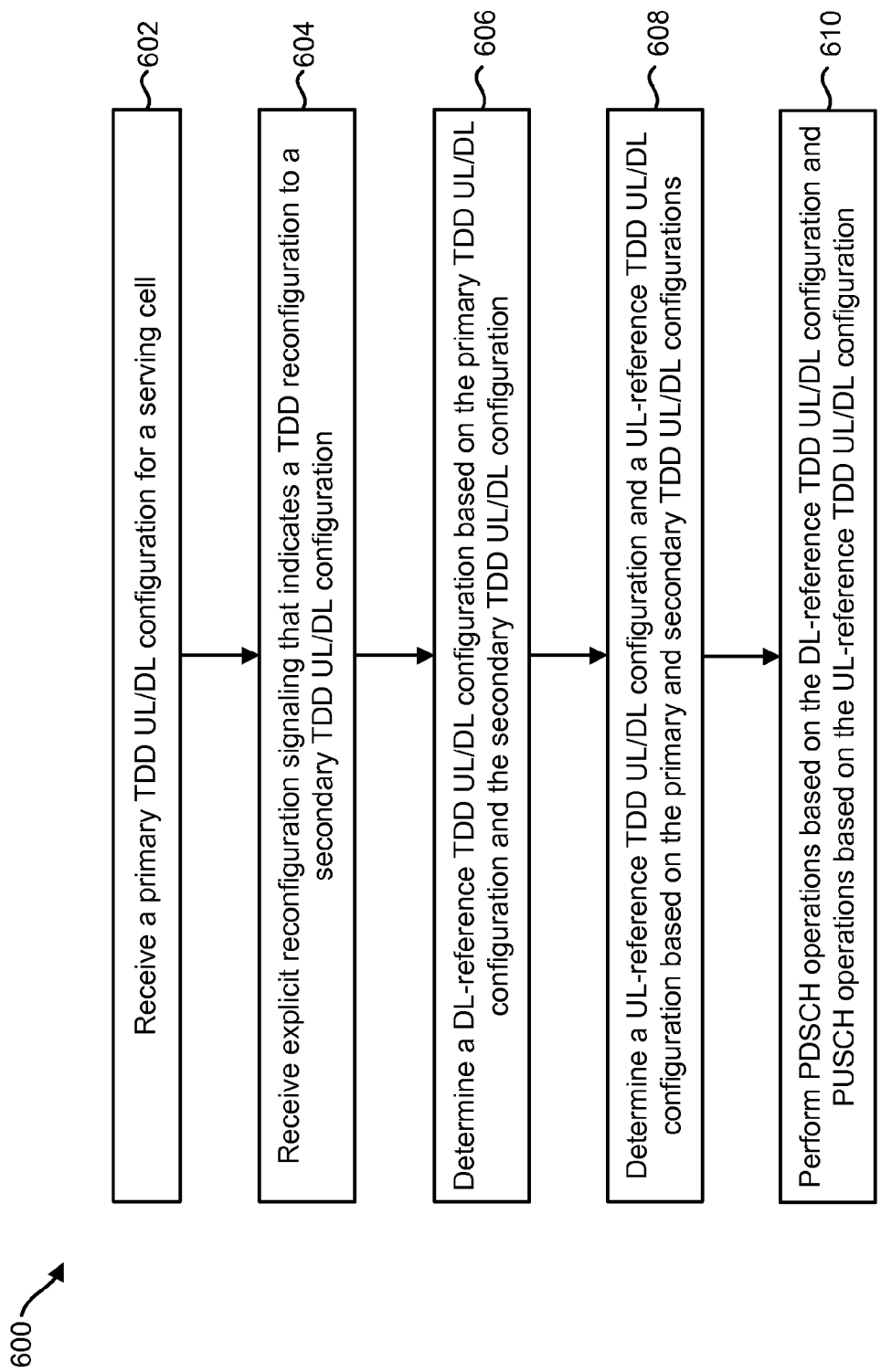
FIG. 6 is a flow diagram illustrating a more detailed implementation of a method for signaling reference configurations by a UE.

FIG. 6 is a flow diagram illustrating a more detailed implementation of a method 600 for signaling reference configurations by a UE 102. The UE 102 may be configured with dynamic TDD UL/DL reconfiguration support (e.g., eIMTA support). The UE 102 may receive 602 a primary TDD UL/DL configuration 128 for a serving cell.

The serving cell may be a dynamic TDD UL/DL reconfiguration cell (e.g., an eIMTA cell). The UE 102 may receive 602 signaling to configure the UE 102 with the cell. The signaling may indicate the primary TDD UL/DL configuration 128 for the serving cell. The UE 102 may receive 602 the primary TDD UL/DL configuration 128 in one or more messages.

The primary TDD UL/DL configuration 128 may be the default TDD UL/DL configuration for the serving cell. If the serving cell is a primary cell (PCell), the TDD UL/DL configuration signaled in a system information block (SIB) (e.g., SIB1) may be used as the primary TDD UL/DL configuration 128. If the serving cell is a secondary cell (SCell), the TDD UL/DL configuration signaled in a radio resource control (RRC) message (e.g., RRCCommon) may be used as the primary TDD UL/DL configuration 128.

The UE 102 may receive 604 explicit reconfiguration signaling that indicates a TDD reconfiguration to a secondary TDD UL/DL configuration. The secondary TDD UL/DL configuration may be signaled to be the TDD UL/DL configuration in the next radio frame and/or after the reconfiguration transition. The reconfiguration signaling may include PHY layer signaling or MAC layer signaling that may be used to indicate the secondary TDD UL/DL configuration in the next radio frame for each reconfiguration. The explicit reconfiguration signaling may be a new signal, a new or existing PDCCH or EPDCCH and/or a DCI format.

The UE 102 may determine 606 a DL-reference TDD UL/DL configuration based on the primary TDD UL/DL configuration 128 and the secondary TDD UL/DL configuration. In one case, the primary TDD UL/DL configuration 128 may be used as the DL-reference TDD UL/DL configuration. In another case, the DL-reference TDD UL/DL configuration may be determined 606 based on the pair of the primary TDD UL/DL configuration 128 and the secondary TDD UL/DL configuration by referring to Table (1), as illustrated in FIG. 2 above. For example, the pair (Primary TDD UL/DL configuration, Secondary TDD UL/DL configuration) may be used as the input for (Primary cell TDD UL/DL configuration, Secondary cell TDD UL/DL configuration) in Table (1) to determine 606 the DL-reference TDD UL/DL configuration.

The UE 102 may determine 608 a UL-reference TDD UL/DL configuration based on the primary TDD UL/DL configuration 128 and the secondary TDD UL/DL configuration. In one case, the primary TDD UL/DL configuration 128 may be used as the UL-reference TDD UL/DL configuration. In another case, the secondary TDD UL/DL configuration may be used as the UL-reference UL/DL configuration. In yet another case, the UL-reference TDD UL/DL configuration may be determined 608 based on the pair of the primary TDD UL/DL configuration 128 and the secondary TDD UL/DL configuration by referring to Table (2), as illustrated in FIG. 2 above. For example, the pair (Primary TDD UL/DL configuration, Secondary TDD UL/DL configuration) may be used as the input for (Other serving cell TDD UL/DL configuration, Serving cell TDD UL/DL configuration) in Table (2) to determine 608 the UL-reference TDD UL/DL configuration.

The UE 102 may perform 610 PDSCH operations based on the DL-reference TDD UL/DL configuration, and PUSCH operations based on the UL-reference TDD UL/DL configuration. For example, the DL-reference TDD UL/DL configuration may be used for PDSCH HARQ-ACK reporting timing for the serving cell. Therefore, the UE 102 may send PDSCH HARQ-ACK information based on the DL-reference TDD UL/DL configuration.

The UL-reference TDD UL/DL configuration may be used to perform 610 PUSCH operations. For example, the UL-reference TDD UL/DL configuration may be used for PUSCH scheduling and PUSCH HARQ-ACK timing for the serving cell. Therefore, the UE 102 may send a PUSCH transmission and/or receive PUSCH HARQ-ACK information based on the UL-reference TDD UL/DL configuration.

Figure 7:
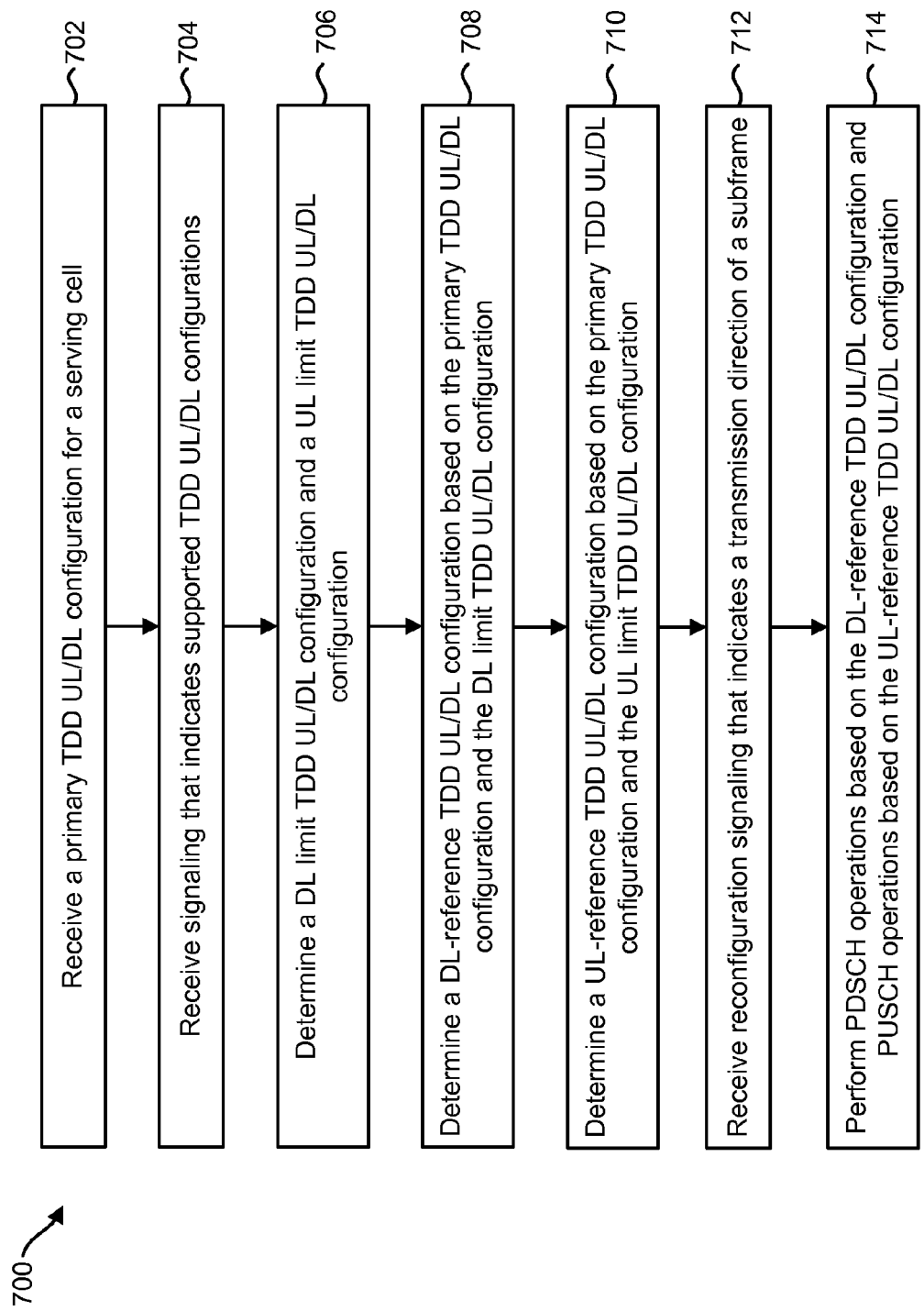
FIG. 7 is a flow diagram illustrating another more detailed implementation of a method for signaling reference configurations by a UE.

FIG. 7 is a flow diagram illustrating another more detailed implementation of a method 700 for signaling reference configurations by a UE 102. The UE 102 may be configured with dynamic TDD UL/DL reconfiguration support (e.g., eIMTA support). The UE 102 may receive 702 a primary TDD UL/DL configuration 128 for a serving cell. The serving cell may be a dynamic TDD UL/DL reconfiguration cell (e.g., an eIMTA cell).

The UE 102 may receive 702 signaling to configure the UE 102 with the cell. The signaling may indicate the primary TDD UL/DL configuration 128 for the serving cell. The UE 102 may receive 702 the primary TDD UL/DL configuration 128 in one or more messages.

The primary TDD UL/DL configuration 128 may be the default TDD UL/DL configuration for the serving cell. If the serving cell is a primary cell (PCell), the TDD UL/DL configuration signaled in a system information block (SIB) (e.g., SIB1) may be used as the primary TDD UL/DL configuration 128. If the serving cell is a secondary cell (SCell), the TDD UL/DL configuration signaled in a radio resource control (RRC) message (e.g., RRCCommon) may be used as the primary TDD UL/DL configuration 128.

The UE 102 may receive 704 signaling that indicates supported TDD UL/DL configurations. For example, when an eIMTA cell configuration is performed, the UE 102 may receive 704 configuration signaling that indicates multiple secondary TDD UL/DL configurations. The configuration signaling may include SIB or RRC signaling. The UE 102 may determine the TDD UL/DL configurations allowed (e.g., supported) for reconfiguration. The supported TDD UL/DL configurations may also be referred to as a reconfiguration range.

The UE 102 may determine 706 a DL limit TDD UL/DL configuration and a UL limit TDD UL/DL configuration. The supported TDD UL/DL configurations may include the DL limit TDD UL/DL configuration, which may be the TDD UL/DL configuration with the maximum DL allocation in the reconfiguration range. The supported TDD UL/DL configurations may also include a UL limit UL/DL configuration, which may be the TDD UL/DL configuration with the maximum UL allocation in the reconfiguration range.

The UE 102 may determine 708 a DL-reference TDD UL/DL configuration based on the primary TDD UL/DL configuration 128 and the DL limit TDD UL/DL configuration. This may be accomplished by referring to Table (1), as described in connection with FIG. 2. For example, the pair (Primary TDD UL/DL configuration, DL limit TDD UL/DL configuration) may be used as the input for (Primary cell TDD UL/DL configuration, Secondary cell TDD UL/DL configuration) in Table (1) to determine 708 the DL-reference TDD UL/DL configuration.

The UE 102 may determine 710 a UL-reference TDD UL/DL configuration based on the primary TDD UL/DL configuration 128 and the UL limit TDD UL/DL configuration. In one implementation, the UL limit TDD UL/DL configuration may be used as the UL-reference UL/DL configuration. In another implementation, the UL-reference TDD UL/DL configuration may be determined 710 based on the pair of the primary TDD UL/DL configuration 128 and the UL limit TDD UL/DL configuration of an eIMTA cell by referring to Table (2) above. For example, the pair (Primary TDD UL/DL configuration, Secondary TDD UL/DL configuration) may be used as the input for (Other serving cell TDD UL/DL configuration, Serving cell TDD UL/DL configuration) in Table (2) to determine 710 the UL-reference TDD UL/DL configuration.

The UE 102 may receive 712 reconfiguration signaling that indicates a transmission direction of a subframe. The use of the subframes may be dynamically signaled by implicit signaling or explicit signaling. Explicit or implicit PHY signaling or MAC signaling may be applied for the TDD UL/DL reconfiguration. In one implementation, the UE 102 may use a given subframe following an implicit signaling of subframe direction. In another implementation, the UE 102 may use a given subframe following an explicit signaling of the subframe direction.

The UE 102 may perform 714 PDSCH operations based on the DL-reference TDD UL/DL configuration, and PUSCH operations based on the UL-reference TDD UL/DL configuration. For example, the DL-reference TDD UL/DL configuration may be used for PDSCH HARQ-ACK reporting timing. Therefore, the UE 102 may send PDSCH HARQ-ACK information based on the DL-reference TDD UL/DL configuration.

The UL-reference TDD UL/DL configuration may be used to perform 714 PUSCH operations. For example, the UL-reference TDD UL/DL configuration may be used for PUSCH scheduling and PUSCH HARQ-ACK timing. Therefore, the UE 102 may send a PUSCH transmission and/or receive PUSCH HARQ-ACK information based on the UL-reference TDD UL/DL configuration.

Figure 8:
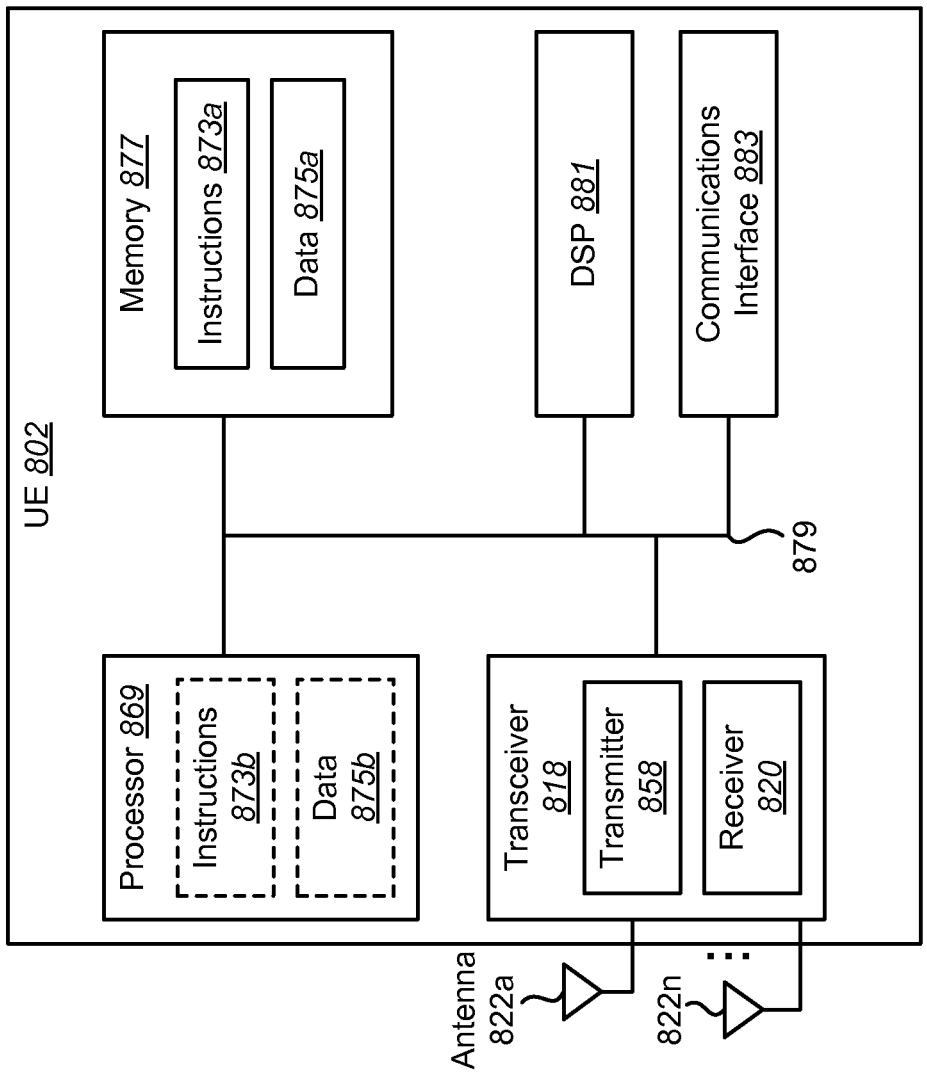
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 869 that controls operation of the UE 802. The processor 869 may also be referred to as a central processing unit (CPU). Memory 877, which may include read-only memory (ROM), random access memory (RAM), a combination of the two or any type of device that may store information, provides instructions 873*a* and data 875*a* to the processor 869. A portion of the memory 877 may also include non-volatile random access memory (NVRAM). Instructions 873*b* and data 875*b* may also reside in the processor 869. Instructions 873*b* and/or data 875*b* loaded into the processor 869 may also include instructions 873*a* and/or data 875*a* from memory 877 that were loaded for execution or processing by the processor 869. The instructions 873*b* may be executed by the processor 869 to implement one or more of the methods 200, 600 and 700 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822*a*-*n* are attached to the housing and electrically coupled to the transceiver 818.

The various components of the UE 802 are coupled together by a bus system 879, which may include a power bus, a control signal bus and a status signal bus, in addition to a data bus. However, for the sake of clarity, the various buses are illustrated in FIG. 8 as the bus system 879. The UE 802 may also include a digital signal processor (DSP) 881 for use in processing signals. The UE 802 may also include a communications interface 883 that provides user access to the functions of the UE 802. The UE 802 illustrated in FIG. 8 is a functional block diagram rather than a listing of specific components.

Figure 9:
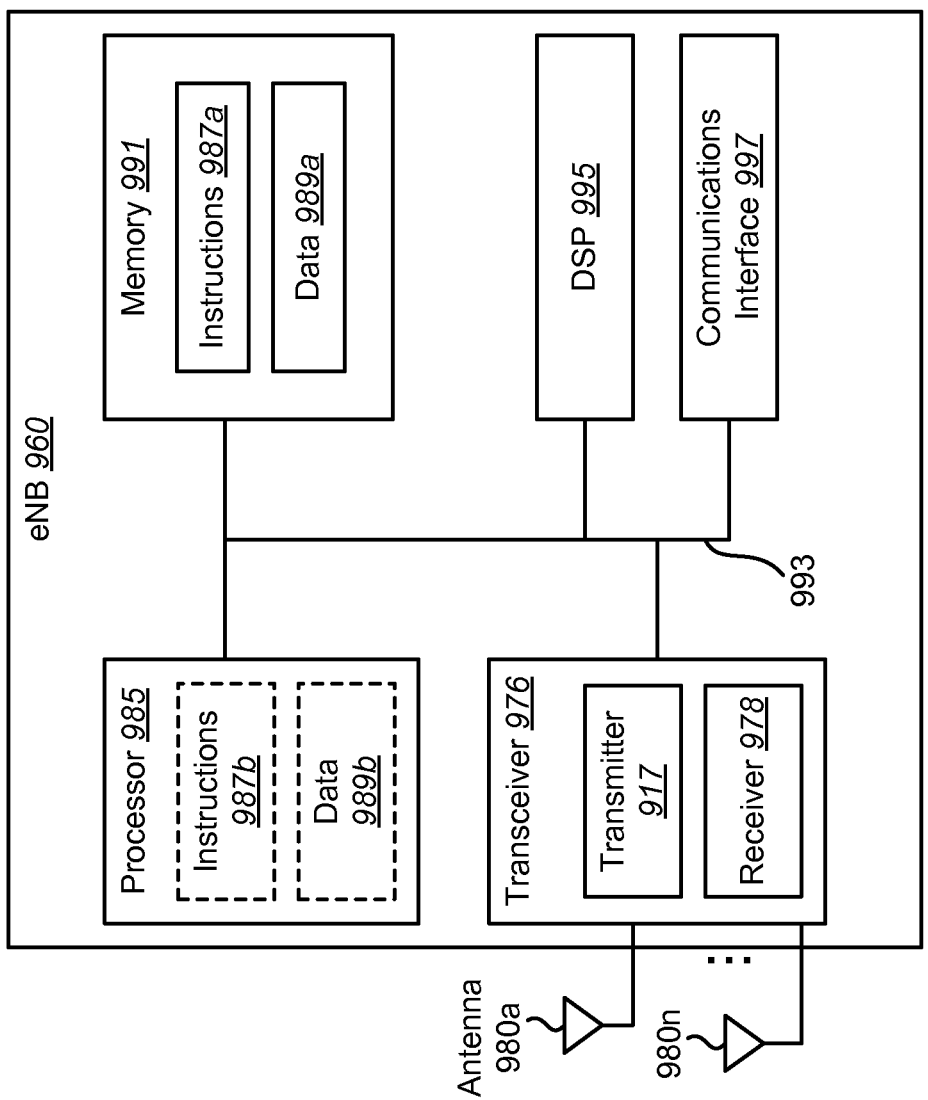
FIG. 9 illustrates various components that may be utilized in an eNB.

FIG. 9 illustrates various components that may be utilized in an eNB 960. The eNB 960 described in connection with FIG. 9 may be implemented in accordance with the eNB 160 described in connection with FIG. 1. The eNB 960 includes a processor 985 that controls operation of the eNB 960. The processor 985 may also be referred to as a central processing unit (CPU). Memory 991, which may include read-only memory (ROM), random access memory (RAM), a combination of the two or any type of device that may store information, provides instructions 987*a* and data 989*a* to the processor 985. A portion of the memory 991 may also include non-volatile random access memory (NVRAM). Instructions 987*b* and data 989*b* may also reside in the processor 985. Instructions 987*b* and/or data 989*b* loaded into the processor 985 may also include instructions 987*a* and/or data 989*a* from memory 991 that were loaded for execution or processing by the processor 985. The instructions 987*b* may be executed by the processor 985 to implement one or more of the method 300 described above.

The eNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980*a*-*n* are attached to the housing and electrically coupled to the transceiver 976.

The various components of the eNB 960 are coupled together by a bus system 993, which may include a power bus, a control signal bus and a status signal bus, in addition to a data bus. However, for the sake of clarity, the various buses are illustrated in FIG. 9 as the bus system 993. The eNB 960 may also include a digital signal processor (DSP) 995 for use in processing signals. The eNB 960 may also include a communications interface 997 that provides user access to the functions of the eNB 960. The eNB 960 illustrated in FIG. 9 is a functional block diagram rather than a listing of specific components.

Figure 10:
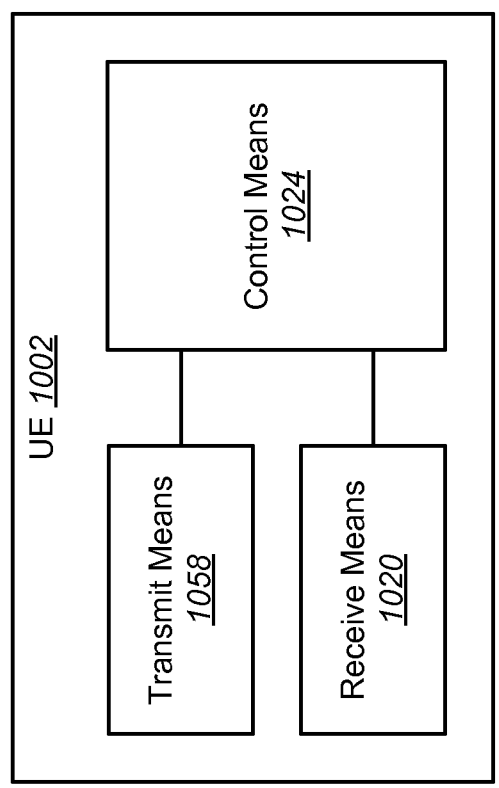
FIG. 10 is a block diagram illustrating one configuration of a UE in which systems and methods for feedback reporting may be implemented.

FIG. 10 is a block diagram illustrating one configuration of a UE 1002 in which systems and methods for feedback reporting may be implemented. The UE 1002 includes transmit means 1058, receive means 1020 and control means 1024. The transmit means 1058, receive means 1020 and control means 1024 may be configured to perform one or more of the functions described in connection with FIG. 2, FIG. 6, FIG. 7 and FIG. 8 above. FIG. 8 above illustrates one example of a concrete apparatus structure of FIG. 10. Other various structures may be implemented to realize one or more of the functions of FIG. 2, FIG. 6, FIG. 7 and FIG. 8. For example, a DSP may be realized by software.

Figure 11:
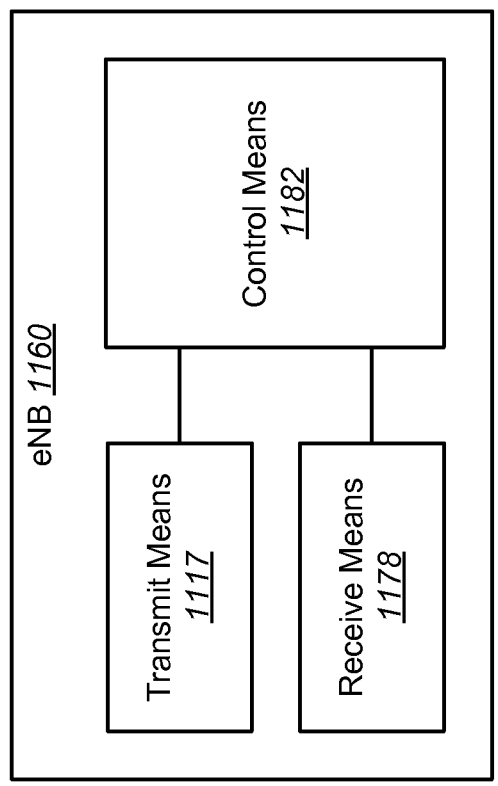
FIG. 11 is a block diagram illustrating one configuration of an eNB in which systems and methods for feedback reporting may be implemented.

FIG. 11 is a block diagram illustrating one configuration of an eNB 1160 in which systems and methods for feedback reporting may be implemented. The eNB 1160 includes transmit means 1117, receive means 1178 and control means 1182. The transmit means 1117, receive means 1178 and control means 1182 may be configured to perform one or more of the functions described in connection with FIG. 3 and FIG. 9 above. FIG. 9 above illustrates one example of a concrete apparatus structure of FIG. 11. Other various structures may be implemented to realize one or more of the functions of FIG. 3. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) comprising:
a processor; and
memory in electronic communication with the processor, wherein instructions stored in the memory are executable to:
receive, using a receiver, a physical downlink control channel (PDCCH) indicating an actual TDD UL/DL configuration in a serving cell;
configure a downlink (DL)-reference TDD UL/DL configuration of the serving cell based on a DL-reference TDD UL/DL configuration configured based on radio resource control (RRC) signaling and a UL/DL configuration that the UE has dynamically received on the PDCCH; and
configure an uplink (UL)-reference TDD UL/DL configuration of the serving cell, wherein
the DL-reference TDD UL/DL configuration and the UL-reference TDD UL/DL configuration are configured based on higher layer signaling,
the DL-reference TDD UL/DL configuration is used for Physical Downlink Shared Channel (PDSCH) operations, and
the UL-reference TDD UL/DL configuration is used for Physical Uplink Shared Channel (PUSCH) operations.

2. The UE of claim 1, wherein the UL-reference TDD UL/DL configuration is configured based on system information block (SIB).

3. The UE of claim 1, wherein the PDCCH indicating the actual TDD UL/DL configuration in a next radio frame.

4. The UE of claim 1, wherein the actual TDD UL/DL configuration specifies transmission directions of subframes in a radio frame.

5. An evolved node B (eNB) comprising:
a processor; and
memory in electronic communication with the processor, wherein instructions stored in the memory are executable to:
transmit, using a transmitter, a physical downlink control channel (PDCCH) indicating an actual TDD UL/DL configuration in a serving cell;
determine a downlink (DL)-reference TDD UL/DL configuration of the serving cell, wherein the DL-reference TDD UL/DL configuration is configured in a user equipment (UE) based on a DL-reference TDD UL/DL configuration configured based on radio resource control (RRC) signaling and a UL/DL configuration that the UE has dynamically received on the PDCCH; and
determine an uplink (UL)-reference TDD UL/DL configuration of the serving cell, wherein
the DL-reference TDD UL/DL configuration and the UL-reference TDD UL/DL configuration are configured, in a user equipment (UE), based on higher layer signaling,
the DL-reference TDD UL/DL configuration is used for Physical Downlink Shared Channel (PDSCH) operations, and
the UL-reference TDD UL/DL configuration is used for Physical Uplink Shared Channel (PUSCH) operations.

6. The UE of claim 5, wherein the UL-reference TDD UL/DL configuration is configured, in the UE, based on system information block (SIB).

7. The UE of claim 5, wherein the PDCCH indicating the actual TDD UL/DL configuration in a next radio frame.

8. The UE of claim 5, wherein the actual TDD UL/DL configuration specifies transmission directions of subframes in a radio frame.

9. A method for a user equipment (UE), the method comprising:
- receiving a physical downlink control channel (PDCCH) indicating an actual TDD UL/DL configuration in a serving cell;
- configuring a downlink (DL)-reference TDD UL/DL configuration of the serving cell based on a DL-reference TDD UL/DL configuration configured based on radio resource control (RRC) signaling and a UL/DL configuration that the UE has dynamically received on the PDCCH; and
- configuring an uplink (UL)-reference TDD UL/DL configuration of the serving cell, wherein
- the DL-reference TDD UL/DL configuration and the UL-reference TDD UL/DL configuration are configured based on higher layer signaling,
- the DL-reference TDD UL/DL configuration is used for Physical Downlink Shared Channel (PDSCH) operations, and
- the UL-reference TDD UL/DL configuration is used for Physical Uplink Shared Channel (PUSCH) operations.

10. A method for an evolved node B (eNB), the method comprising:
- transmitting a physical downlink control channel (PDCCH) indicating an actual TDD UL/DL configuration in a serving cell;
- determining a downlink (DL)-reference TDD UL/DL configuration of the serving cell, wherein the DL-reference TDD UL/DL configuration is configured in a user equipment (UE) based on a DL-reference TDD UL/DL configuration configured based on radio resource control (RRC) signaling and a UL/DL configuration that the UE has dynamically received on the PDCCH; and
- determining an uplink (UL)-reference TDD UL/DL configuration of the serving cell, wherein
- the DL-reference TDD UL/DL configuration and the UL-reference TDD UL/DL configuration are configured, in a user equipment (UE), based on higher layer signaling,
- the DL-reference TDD UL/DL configuration is used for Physical Downlink Shared Channel (PDSCH) operations, and
- the UL-reference TDD UL/DL configuration is used for Physical Uplink Shared Channel (PUSCH) operations.

* * * * *